(12) United States Patent
Michael et al.

(10) Patent No.: US 12,158,229 B2
(45) Date of Patent: Dec. 3, 2024

(54) PHOTOVOLTAIC WIRE MANAGEMENT CLIP

(71) Applicant: SHOALS TECHNOLOGIES GROUP, LLC, Portland, TN (US)

(72) Inventors: Dorothy Michael, Portland, TN (US); Dean Solon, Gallatin, TN (US)

(73) Assignee: SHOALS TECHNOLOGIES GROUP, LLC, Portland, TN (US)

( * ) Notice: Subject to any disclaimer, the term of this patent is extended or adjusted under 35 U.S.C. 154(b) by 0 days.

(21) Appl. No.: 18/184,474

(22) Filed: Mar. 15, 2023

(65) Prior Publication Data

US 2023/0296192 A1 Sep. 21, 2023

Related U.S. Application Data

(60) Provisional application No. 63/322,102, filed on Mar. 21, 2022.

(51) Int. Cl.
| | | |
|---|---|---|
| *F16L 3/00* | (2006.01) | |
| *F16L 3/06* | (2006.01) | |
| *H02S 30/20* | (2014.01) | |

(52) U.S. Cl.
CPC ............... *F16L 3/06* (2013.01); *H02S 30/20* (2014.12)

(58) Field of Classification Search
None
See application file for complete search history.

(56) References Cited

U.S. PATENT DOCUMENTS

| | | |
|---|---|---|
| 1,982,501 A | 11/1934 | Douglas |
| D188,323 S | 7/1960 | Johnson |
| 3,053,930 A | 9/1962 | Mallanik et al. |
| 3,136,515 A | 6/1964 | Potruch |
| 3,233,851 A | 2/1966 | Lemieux |

(Continued)

FOREIGN PATENT DOCUMENTS

| | | |
|---|---|---|
| CN | 102339870 A | 2/2012 |
| GB | 2464680 A | 4/2010 |
| WO | 2018032033 A1 | 2/2018 |

OTHER PUBLICATIONS

International Search Report and Written Opinion for International Application No. PCT/US2022/027478 mailed Sep. 2, 2022, 9 pgs.
(Continued)

*Primary Examiner* — Steven M Marsh
(74) *Attorney, Agent, or Firm* — MASCHOFF BRENNAN

(57) ABSTRACT

A component retention clip includes a body, a grip element, and bottom slide-coupling elements. The body has a base wall and two side walls forming a planar slot therebetween. The grip element is in the slot and coupled with at least one of the two side walls. The bottom slide-coupling elements are on an outer surface of at least one of the two side walls, each bottom slide-coupling element having a tapered cross-sectional profile in a longitudinal plane that narrows in a sliding axis towards an edge of the respective side wall and having a trapezoidal cross-sectional profile in a lateral plane that is orthogonal with the longitudinal plane. The bottom slide-coupling elements include first and second bottom slide-coupling elements, each having a first or second longitudinal plane in a first or second sliding axis.

18 Claims, 14 Drawing Sheets

(56) References Cited

U.S. PATENT DOCUMENTS

| | | |
|---|---|---|
| 3,353,567 A | 11/1967 | Isreeli |
| 3,564,668 A | 2/1971 | Kirk |
| 3,601,756 A | 8/1971 | Stroh |
| D269,851 S | 7/1983 | Kimura |
| 4,669,156 A | 6/1987 | Guido et al. |
| D296,074 S | 6/1988 | Seyfarth |
| D297,813 S | 9/1988 | Marx |
| D331,698 S | 12/1992 | Pezzoli |
| D332,401 S | 1/1993 | Araujo, Jr. |
| 5,331,725 A | 7/1994 | Chou |
| D363,211 S | 10/1995 | Noble |
| D375,890 S | 11/1996 | Takai |
| D376,309 S | 12/1996 | Takai |
| 5,613,655 A | 3/1997 | Marion |
| 5,615,852 A | 4/1997 | Heidorn et al. |
| D379,060 S | 5/1997 | Laga |
| D387,652 S | 12/1997 | Carlson, Jr. |
| D406,383 S | 3/1999 | Adams |
| 6,227,502 B1 | 5/2001 | Derman |
| 6,405,414 B1 | 6/2002 | Byrnes |
| 6,477,744 B1 | 11/2002 | Miles |
| D482,269 S | 11/2003 | Martello |
| 6,802,480 B1 | 10/2004 | Martello |
| D503,926 S | 4/2005 | Marrs |
| D510,015 S | 9/2005 | Hostetler |
| 7,162,836 B2 | 1/2007 | Van Straaten |
| D568,254 S | 5/2008 | Patchett |
| D581,255 S | 11/2008 | Calvin |
| D584,132 S | 1/2009 | Judd |
| D637,473 S | 5/2011 | Mitchell |
| D640,527 S | 6/2011 | Hoek |
| D646,556 S | 10/2011 | Kelleghan |
| D657,869 S | 4/2012 | Mammen |
| D660,690 S | 5/2012 | Mixides |
| D704,594 S | 5/2014 | Cherin |
| D728,349 S | 5/2015 | Lake |
| D729,619 S | 5/2015 | Cherin |
| D731,296 S | 6/2015 | Nelson |
| D732,422 S | 6/2015 | Fildan |
| D733,534 S | 7/2015 | Altrichter |
| D753,260 S | 4/2016 | Solovov, Jr. |
| D755,043 S | 5/2016 | Bailey |
| D784,798 S | 4/2017 | Logsdon |
| D791,558 S | 7/2017 | Carpio |
| D803,164 S | 11/2017 | Noble |
| D803,165 S | 11/2017 | Noble |
| 9,903,511 B2 | 2/2018 | Vermillion |
| D811,690 S | 3/2018 | Berte |
| D815,982 S | 4/2018 | Chang |
| D818,391 S | 5/2018 | Chang |
| D818,392 S | 5/2018 | Chang |
| D824,800 S | 8/2018 | Blume |
| D840,795 S | 2/2019 | Tribbett |
| D845,168 S | 4/2019 | Paik |
| D848,899 S | 5/2019 | Chang |
| 10,433,926 B2 | 10/2019 | Recanati |
| D899,237 S | 10/2020 | Peck |
| D906,790 S | 1/2021 | Ng |
| D928,311 S | 8/2021 | McVaney |
| D932,007 S | 9/2021 | Moudy |
| D942,256 S | 2/2022 | Christiansen |
| 11,236,858 B1 | 2/2022 | Rigby |
| D945,379 S | 3/2022 | Allender-Zivic |
| D945,865 S | 3/2022 | Arnold |
| D957,919 S | 7/2022 | Bredl |
| D968,944 S | 11/2022 | Liu |
| D970,455 S | 11/2022 | Xiao |
| D974,879 S | 1/2023 | Wu |
| D975,030 S | 1/2023 | Atwood |
| D976,690 S | 1/2023 | Peng |
| D977,949 S | 2/2023 | Li |
| D981,823 S | 3/2023 | Hongmeng |
| D981,825 S | 3/2023 | Hu |
| D991,780 S | 7/2023 | Michael et al. |
| D996,373 S | 8/2023 | Michael et al. |
| D997,106 S | 8/2023 | Michael |
| D997,886 S | 9/2023 | Michael |
| D997,887 S | 9/2023 | Michael |
| D997,888 S | 9/2023 | Michael |
| 11,949,373 B1 * | 4/2024 | Jasmin .................... H02S 40/30 |
| 2003/0061690 A1 | 4/2003 | Finley et al. |
| 2004/0118798 A1 | 6/2004 | Spiers et al. |
| 2005/0120652 A1 | 6/2005 | Cacciani et al. |
| 2009/0094799 A1 | 4/2009 | Ashel |
| 2009/0293233 A1 | 12/2009 | Ho et al. |
| 2011/0260011 A1 | 10/2011 | Yu et al. |
| 2012/0192925 A1 | 8/2012 | Grushkowitz |
| 2014/0061396 A1 | 3/2014 | Magno et al. |
| 2014/0326838 A1 | 11/2014 | West et al. |
| 2014/0374544 A1 | 12/2014 | Pearson et al. |
| 2015/0219248 A1 | 8/2015 | Lares |
| 2016/0111996 A1 | 4/2016 | Stephan et al. |
| 2016/0282018 A1 | 9/2016 | Ash |
| 2018/0080579 A1 | 3/2018 | Costigan |
| 2018/0366926 A1 | 12/2018 | Schulte |
| 2019/0081469 A1 | 3/2019 | Shea et al. |
| 2019/0149087 A1 | 5/2019 | McPheeters et al. |
| 2020/0107466 A1 | 4/2020 | Hjelmfelt et al. |
| 2020/0366076 A1 * | 11/2020 | Naugler .................. H02S 40/30 |
| 2021/0033220 A1 | 2/2021 | Laughlin |
| 2021/0213231 A1 | 7/2021 | Spear |
| 2022/0356963 A1 | 11/2022 | Michael et al. |
| 2022/0359102 A1 | 11/2022 | Michael |
| 2022/0360059 A1 | 11/2022 | Michael et al. |
| 2023/0245798 A1 | 8/2023 | Michael et al. |

OTHER PUBLICATIONS

International Search Report and Written Opinion for International Application No. PCT/US2022/027483 mailed Aug. 16, 2022, 8 pgs.
Invitation to pay fees for International Application No. PCT/US2022/027792 mailed Aug. 1, 2022, 2 pgs.
International Search Report and Written Opinion for International Application No. PCT/US2022/027792 mailed Oct. 5, 2022, 11 pgs.
Invitation to pay fees for International Application No. PCT/US2023/015303 mailed May 22, 2023, 2 pgs.
International Search Report and Written Opinion for International Application No. PCT/US2023/015303 mailed Jul. 28, 2023, 13 pgs.
International Search Report and Written Opinion for International Application No. PCT/US2023/017566 mailed Jun. 27, 2023, 9 pgs.

* cited by examiner

PHOTOVOLTAIC WIRE MANAGEMENT CLIP

CROSS-REFERENCE TO RELATED APPLICATION

This application claims the benefit of and priority to U.S. Provisional App. No. 63/322,102 filed on Mar. 21, 2022. The 63/322,102 application is herein incorporated by reference in its entirety.

BACKGROUND

Solar power has long been considered a niche utility. It is considered desirable from an environmental and political standpoint, but perhaps not economically feasible for generating enough power to make a meaningful contribution to the grid. However, as the problems associated with our dependence on fossil fuels have become better understood, more attention has been paid to so-called alternative energy such as solar power. This attention has led to significant technological and policy advances, such that solar power is now quite prevalent, and more economically feasible.

Technological advances in the generation of solar energy have occurred in multiple areas, including collector material and structure, and wiring infrastructure. Wiring infrastructure, however, continues to present challenges, particularly in large scale solar photovoltaic (PV) panel array installations. Proper wire management is vital to the health of the PV system. Damaged wire insulation can lead to ground-faults, system downtime and fire. Moreover, PV systems are installed in various geographic locations, and experience extreme weather and environmental conditions. The wiring infrastructure must defy wind and weather conditions for many years and must reliably safeguard various electricity yields. The sheer number of cables associated with a typical PV array installation adds to the difficulty in providing efficient and effective wire management.

In addition, PV modules are often mounted to solar tracking systems and the like via bracket or clamp systems. The PV modules are moved to maximize sun exposure. Thus, it is desirable to orient the cables in a manner that accommodates movement of respective PV modules, and in a manner that avoids entanglement or damage to the cables themselves.

To date, there are inadequate tools available to organize and manage the large number of cables often found within a typical PV array installation. Often, installers are left to using zip ties or the like, which, at best, groups cables in a haphazard manner. Such approaches make it difficult to organize cables with respect to the panels and the panel support structures. Moreover, for purposes of repair and maintenance, this approach requires ties to be cut, and then re-established with new ties, which is time consuming, and can lead to damage to the cables/wires when a zip tie is cut.

The claimed subject matter is not limited to embodiments that solve any disadvantages or that operate only in environments such as those described above. This background is only provided to illustrate examples of where the present disclosure may be utilized.

SUMMARY

In some embodiments, a component retention clip may include: a body having a base wall and two side walls forming a planar slot therebetween; at least one grip element in the slot and coupled with at least one of the two side walls; and at least two bottom slide-coupling elements on an outer surface of at least one of the two side walls. Each bottom slide-coupling element may have a tapered cross-sectional profile in a longitudinal plane that narrows in a sliding axis towards an edge of the respective side wall and having a trapezoidal cross-sectional profile in a lateral plane that is orthogonal with the longitudinal plane. The two bottom slide-coupling elements may include: a first bottom slide-coupling element having a first longitudinal plane in a first sliding axis; and a second bottom slide-coupling element having a second longitudinal plane in a second sliding axis that is at an angle (e.g., orthogonal) with the first sliding direction.

In some embodiments, the component retention clip may include at least two grip elements. Each grip element may be located in a grip element slot in the planar slot. In some aspects, at least two receptacles (e.g., apertures/recesses) are formed in the respective side wall coupled with the at least two grip elements. Each receptacle may be configured for receiving a retention spur of the respective grip element.

In some embodiments, the component retention clip may include at least three bottom slide-coupling elements. In this configuration, at least two of the bottom slide coupling elements have a trapezoidal cross-sectional profile in the longitudinal plane. In some aspects, at least one bottom slide-coupling element is a bi-directional slide-coupling element that is located on the outer surface of the respective wall. The bi-directional slide-coupling element may have at least two trapezoidal cross-sectional profiles that each taper towards opposite edges of the respective wall.

In some embodiments, the bottom slide-coupling element may be a protrusion configuration or a receptacle/recess configuration. In some aspects, each bottom slide-coupling element is a protruding slide-coupling element that has the trapezoidal cross-sectional profile. In some aspects, each bottom slide-coupling element is a recess slide-coupling element that has the trapezoidal cross-sectional profile.

In some embodiments, a cable retention clip may include a body defining at least two cable retention channels each having a cable opening, where each cable retention channel is parallel with each other cable retention channel. The cable retention clip also includes a cable clip slide-coupling element having a slide direction parallel with each cable retention channel. In some aspects, each cable retention channel is a "C"-shape and separated from each other cable retention channel with a cable separator member. In some aspects, each cable clip slide-coupling element is a protruding slide-coupling element that has the trapezoidal cross-sectional profile. In some aspects, each cable clip slide-coupling element is a recess slide-coupling element that has the trapezoidal cross-sectional profile.

In some embodiments, a cable retention clip assembly may include an embodiment of the component retention clip and an embodiment of the cable retention clip coupled with the component retention clip. The coupling may be a slide-coupling that provides a friction fit. In some aspects, the bottom slide-coupling element retains the cable clip slide-coupling element so as to couple the component retention clip with the cable retention clip. In some aspects, each bottom slide-coupling element is a protruding slide-coupling element that has the trapezoidal cross-sectional profile, and each cable clip slide-coupling element is a recess slide-coupling element that has the trapezoidal cross-sectional profile. In some aspects, each bottom slide-coupling element is a recess slide-coupling element that has the trapezoidal cross-sectional profile, and each cable clip slide-coupling element is a protruding slide-coupling element that has the trapezoidal cross-sectional profile. In some aspects, the component retention clip has at least three bottom slide-coupling elements, wherein at least two of the bottom slide coupling elements have a trapezoidal cross-sectional profile in the longitudinal plane. In some aspects, the component retention clip has a bi-directional slide-coupling element on the outer surface of the respective wall, the bi-directional slide-coupling element having at least two trapezoidal cross-sectional profiles that each taper towards opposite edges of the respective wall.

In some embodiments, a cable retention clip assembly kit may include: at least one component retention clip of one of the embodiments; and at least one cable retention clip, each cable retention clip of one of the embodiments. In some aspects, each bottom slide-coupling element is configured to slidable couple and friction-fit retain the cable clip slide-coupling element. In some aspects, each bottom slide-coupling element is a protruding slide-coupling element that has the trapezoidal cross-sectional profile, and each cable clip slide-coupling element is a recess slide-coupling element that has the trapezoidal cross-sectional profile. In some aspects, each bottom slide-coupling element is a recess slide-coupling element that has the trapezoidal cross-sectional profile, and each cable clip slide-coupling element is a protruding slide-coupling element that has the trapezoidal cross-sectional profile. In some aspects, the component retention clip has at least bottom three slide-coupling elements, wherein at least two of the bottom slide coupling elements having a trapezoidal cross-sectional profile in the longitudinal plane. In some aspects, the component retention clip includes a bi-directional slide-coupling element on the outer surface of the respective wall, the bi-directional slide-coupling element having at least two trapezoidal cross-sectional profiles that each taper towards opposite edges of the respective wall.

In some embodiments, a method of manufacturing a cable retention clip assembly may include: fabricating the body of the component retention clip to have the base wall and two side walls, and to have the at least two bottom slide-coupling elements on the outer surface of at least one of the two side walls; coupling the at least one grip element with at least one side wall in the slot; fabricating the cable retention clip; and slidably engaging the cable retention clip onto the component retention clip so that the cable clip slide-coupling element of the cable retention clip slidably couples with at least one of the bottom slide-coupling elements with the tapered cross-sectional profile in the longitudinal plane.

In some embodiments, a method of managing cables with the cable retention clip assembly may include: attaching a planar substrate of a component to the component retention clip by being slidable received into the planar slot so as to be gripped with the at least one grip member; and coupling at least one cable into at least one cable retention channel.

In some embodiments, a method of managing cables with the cable retention clip assembly kit may include: attaching a planar substrate of a component to the component retention clip by being slidable received into the planar slot so as to be gripped with the at least one grip member; slidably coupling at least one cable retention clip with the component retention clip by slidably engaging the cable retention clip onto the component retention clip so that the cable clip slide-coupling element of the cable retention clip slidably couples with at least one of the bottom slide-coupling elements with the tapered cross-sectional profile in the longitudinal plane; and coupling at least one cable into at least one cable retention channel.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and following information as well as other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

Reference will be made to the drawings and specific language will be used to describe various aspects of the disclosure. Using the drawings and description in this manner should not be construed as limiting its scope. Additional aspects may be apparent in light of the disclosure, including the claims, or may be learned by practice.

The present disclosure generally relates to cable retention clips and systems suitable for retention and management of cables and wires within a photovoltaic (PV) solar panel array installation. Individually, disclosed clip embodiments may be used to retain one or more cables in an organized manner, and in a manner that allows for easy installation and/or later repair to the cables and/or corresponding panels. Moreover, disclosed embodiments of example clip embodiments may be used to retain cables directly to a PV solar panel support structure, such as a panel mounting bracket, as will be described further below.

Figure 1A:
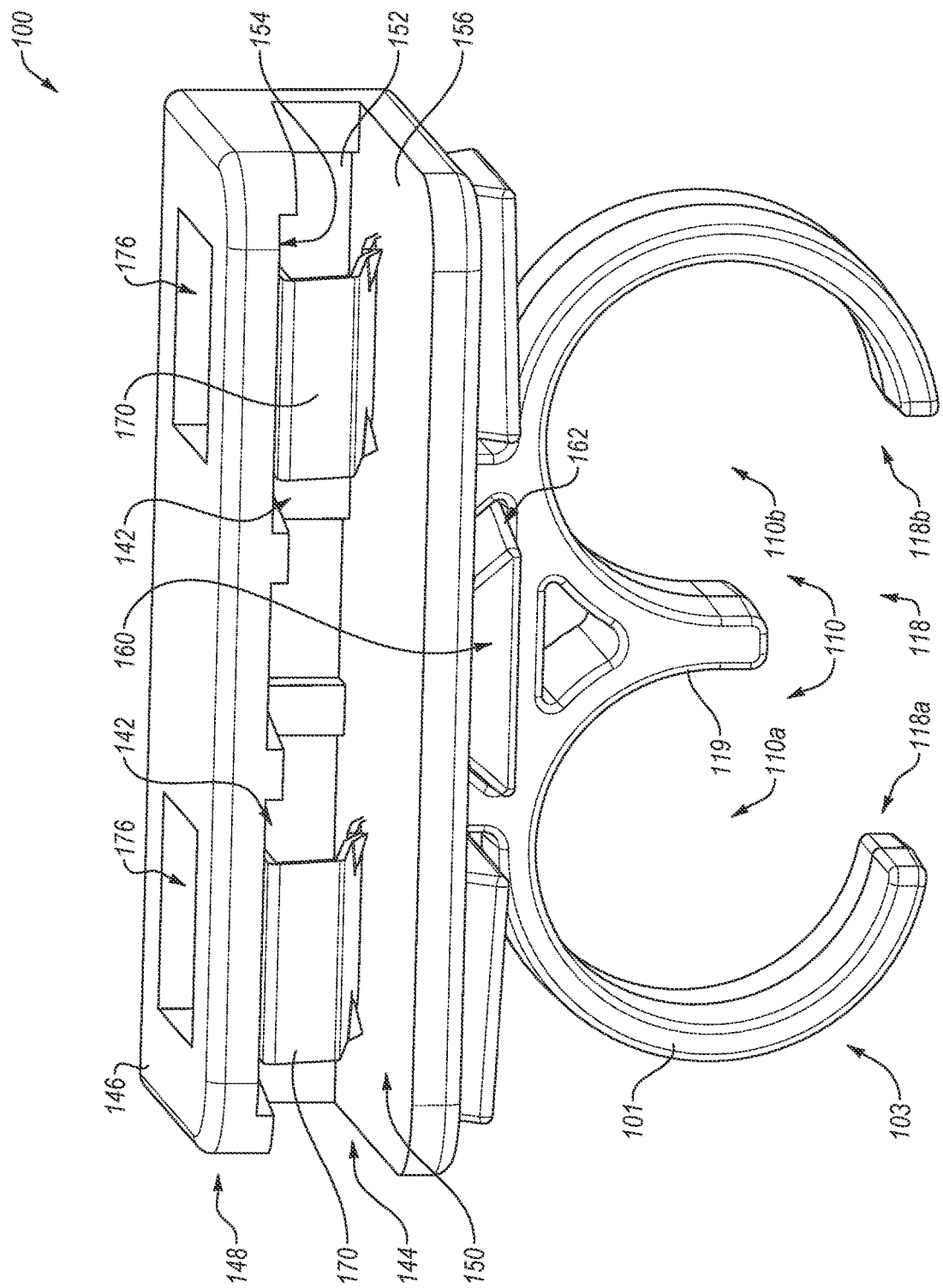
FIG. 1A shows a front perspective view of an embodiment of a cable retention clip assembly.
Figure 1B:
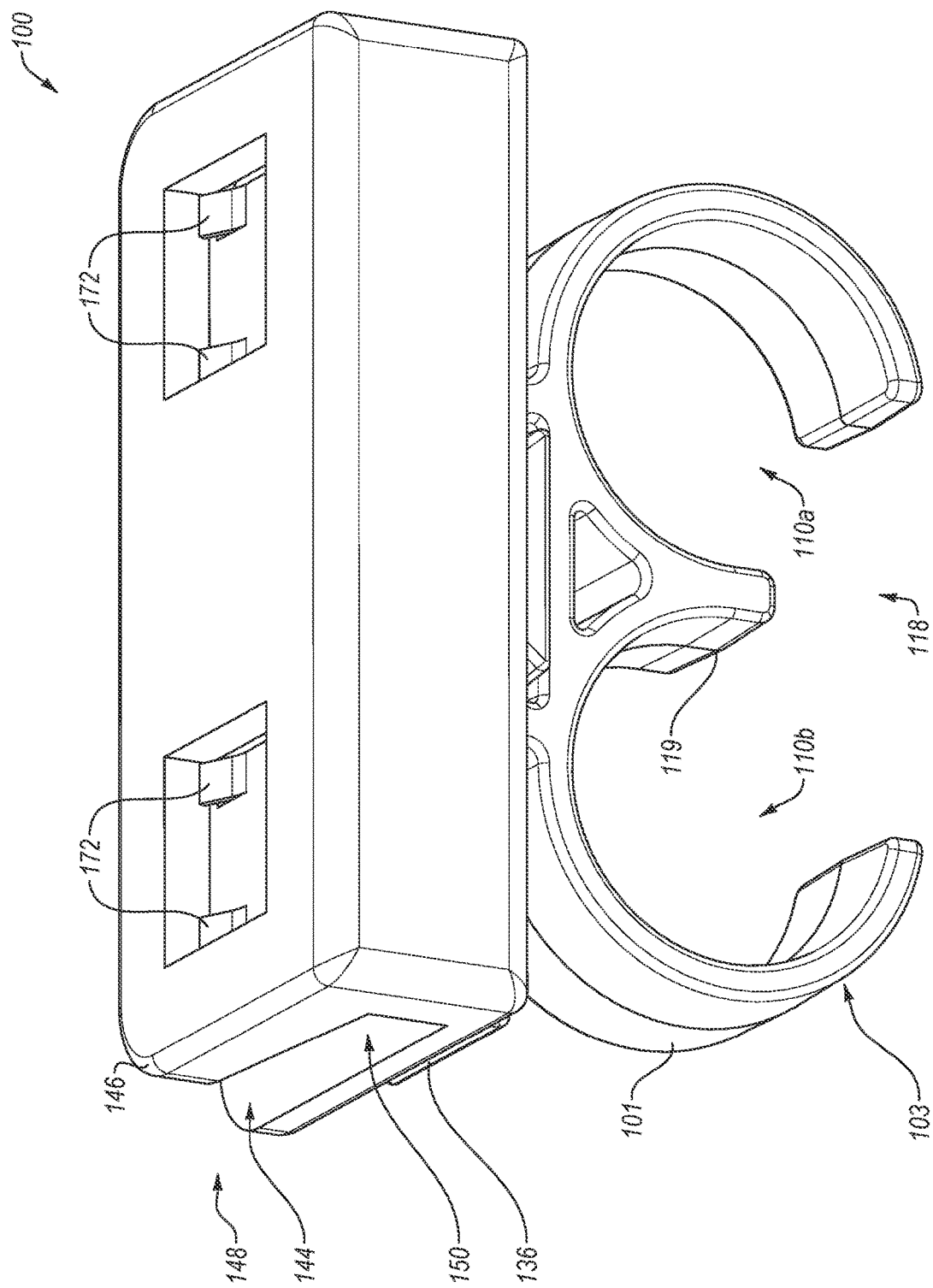
FIG. 1B shows a back perspective view of the cable retention clip assembly of FIG. 1A.
Figure 1C:
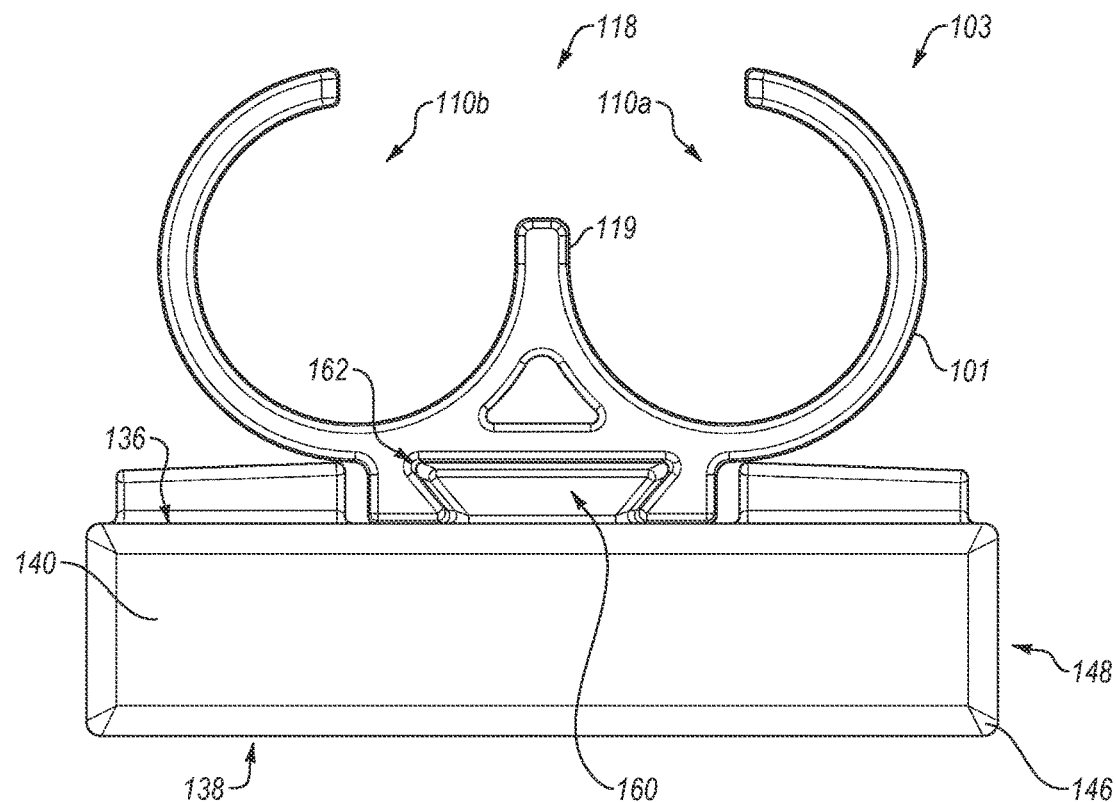
FIG. 1C shows a back view of the cable retention clip assembly of FIG. 1A.
Figure 1D:
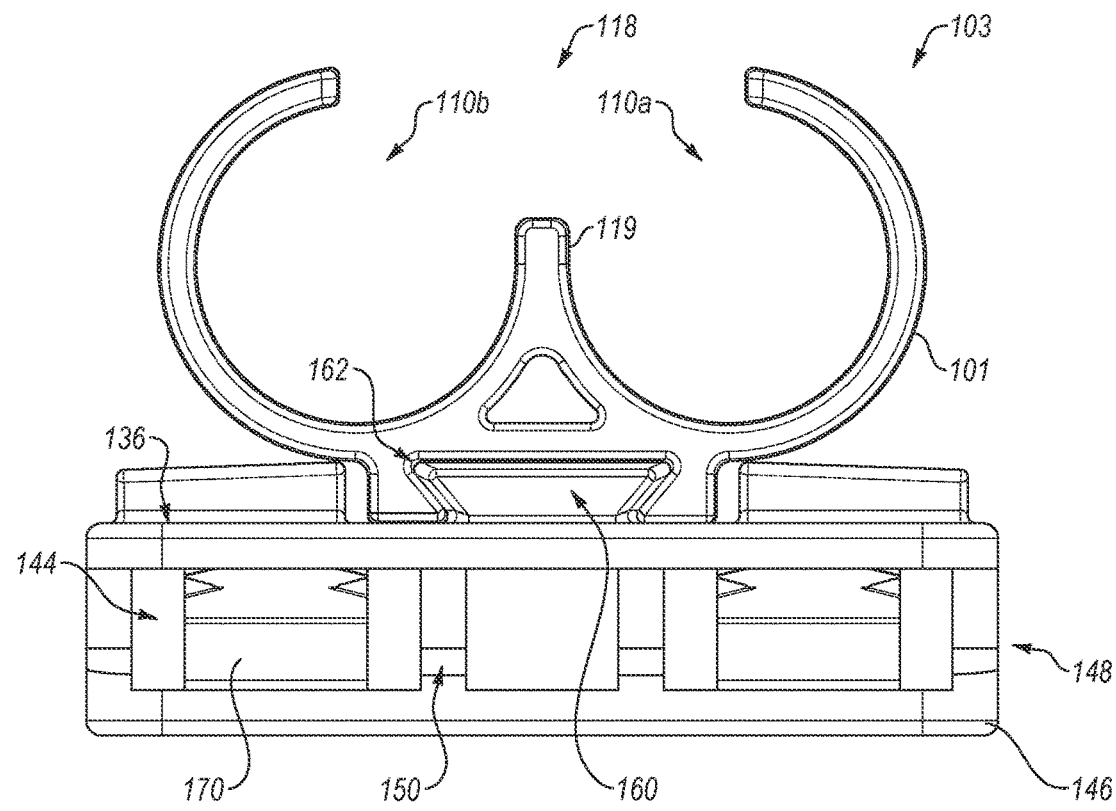
FIG. 1D shows a front view of the cable retention clip assembly of FIG. 1A.
Figure 1E:
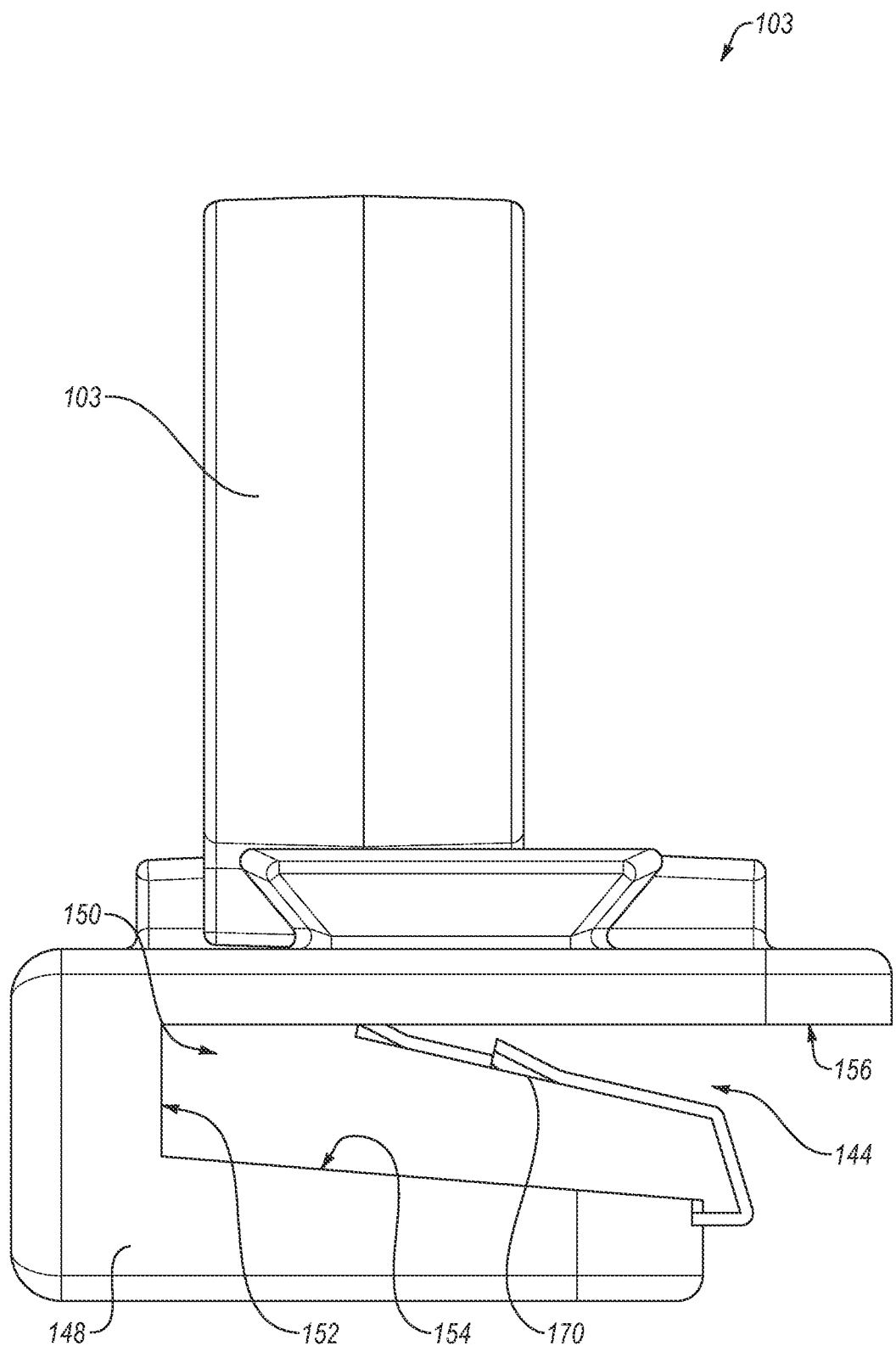
FIG. 1E shows a side view of the cable retention clip assembly of FIG. 1A.
Figure 1F:
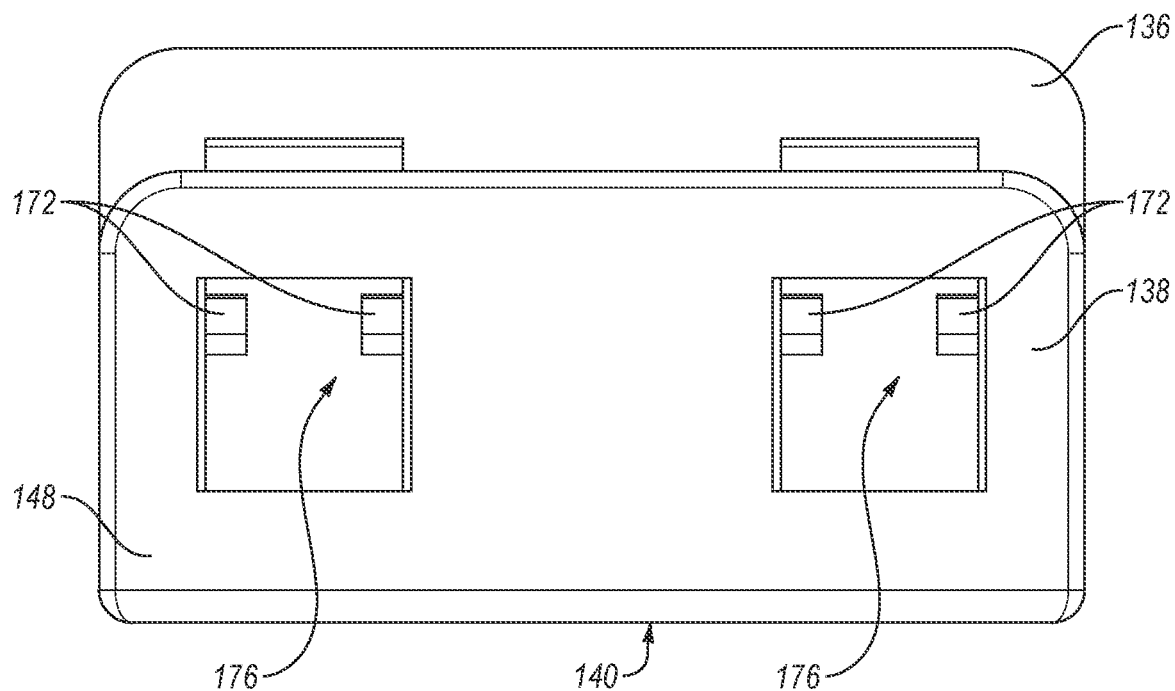
FIG. 1F shows a top view of the cable retention clip assembly of FIG. 1A.
Figure 1G:
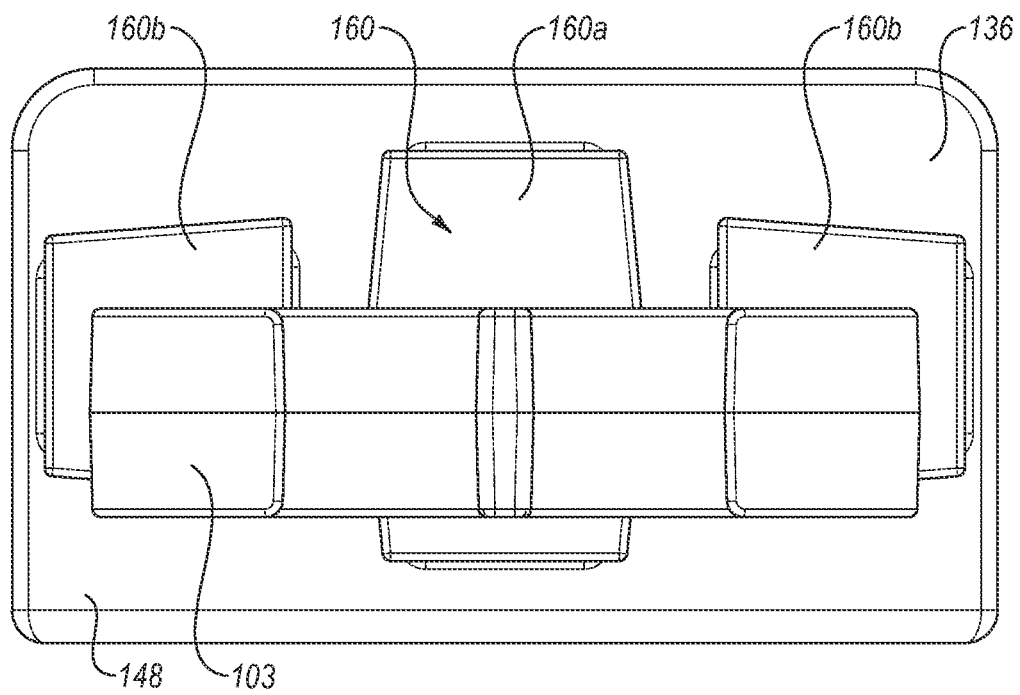
FIG. 1G shows a bottom view of the cable retention clip assembly of FIG. 1A.

Reference is first made to FIGS. 1A-1G, which illustrate an embodiment of a cable retention clip assembly (hereinafter "clip assembly") 100. FIG. 1A shows a front perspective view of the clip assembly 100. FIG. 1B shows a back perspective view of the clip assembly 100. FIG. 1C shows a back view of the clip assembly 100. FIG. 1D shows a front view of the clip assembly 100. FIG. 1E shows a side view of the clip assembly 100. FIG. 1F shows a top view of the clip assembly 100. FIG. 1G shows a bottom view of the clip assembly 100.

As is shown, the clip assembly 100 is configured to be detachably attached to a component of a solar installation system by a component retention clip 148 having a component retention clip body 146 that defines a clip body opening 144. The component retention clip body 146 is configured to couple to a component by receiving a planar substrate of the component through the clip body opening 144. For example, a planar substrate portion of a mounting bracket, H-pile, I-beam, cross-beam, rail, or other beam may slide through the clip body opening 144 of the component retention clip body 146 into a component retention channel 150 (e.g., planar slot). Additionally, the clip assembly 100 is configured to be detachable attached to wires of the solar installation system by a cable retention clip 103. The cable retention clip 103 may include at least one cable retention channel 110. For example, there may be one or more cable retention channels 110 that may couple with cables, where two cable retention channels are shown.

As is shown, the component retention clip 148 may include a grip element 170 in the clip body opening 144 of the component retention clip body 146. The grip element 170 may be attached to the component retention clip 148 via a clip receiver slot 142 (e.g., grip element slot) in the component retention channel 150. The grip element 170 may include a planar member 174 that slides into the clip receiver slot 142. The clip receiver slot 142 may include an aperture 176 (e.g., a receptacle, such as recess etc.), that may receive retention spurs 172 of the grip element 170 to retain the grip element 170 in the clip receiver slot 142.

In use, a component planar substrate (e.g., H-pile 702 of FIG. 7, bracket 102 of FIG. 8) is received through the clip body opening 144 into the component retention channel 150 of the component retention clip body 146 so that the grip element 170 grippingly holds the component planar substrate in the component retention clip body 146. For example, the clip assembly 100 may be attached to an H-pile 702 (FIG. 7) so that the grip element 170 is detachably attached to the H-pile 702. When attached, the grip element 170 provides sufficient coupling so that the clip assembly 100 stays in place on the component planar substrate when holding one or more cables in the cable retention clip 103. In another example, the clip assembly 100 may be mounted to a bracket that may be affixed to any appropriate mounting structure, such as a solar tracker torsion beam, H-pile, or any other suitable support structure having a planar substrate to slide through the clip body opening 144 into the component retention channel 150.

The cable retention clip 103 may be removably coupled with the component retention clip 148 by matable and/or complementary coupling elements. The component retention clip 148 may include protruding slide-coupling elements 160 (e.g., bottom) and the cable retention clip 103 may include slot slide-coupling elements 162 (e.g., cable clip). As shown, the protruding slide-coupling elements 162 are slidingly received into the slot slide-coupling elements 162, such as by aligning and then sliding so that the protrusion is received into the recessed slot. As such, the cable retention clip 103 may be slid onto the component retention clip 148. The protrusions and slots may be tapered (e.g., trapezoidal longitudinal plane) so that there is friction tightening during the slide coupling to fix the bodies together. However, human pulling may be used to slide the cable retention clip 103 off of the component retention clip 148. In some aspects, a cross-sectional shape of each slide-coupling element 160 in a plane perpendicular to the sliding direction may be complementary to a cross-sectional shape of each slot slide-coupling element 162 in a plane perpendicular to the sliding direction.

Individual cables may be held in place with respect to the planar support structure by way of the clip assembly 100 via the cable retention clip 103. As shown, the cable retention clip 103 includes one or more cable retention channels 110a-b, designated generally as 110 (described further below). In this way, the cables may be detachably secured with respect to a support structure (e.g., bracket 102, H-pile 702), thereby allowing for easy installation, removal, and repair. Moreover, securing the cables in this manner may ensure orderly cable management, thereby avoiding damage and entanglement—particularly in the case where the panels/bracket are moveable, such as in a solar tracker application.

As is shown, the cable retention clip 103 of clip assembly 100 may have one or more cable retention channels 110, two of which are shown in the example at 110a-b. As is shown in the example, each cable retention channel 110 provides a cable receiving portion having a suitable shape—here a 'C' shape or partial ring or partial annulus—so as to receive and retain in a detachable manner a corresponding cable, wire, or the like. Each cable retention channel 110 includes an adequate cable retention channel opening 118a-b, designated generally as cable retention channel opening 118, to detachably receive and "clamp" a corresponding cable. The size (e.g., the diameter) of a given cable retention channel 110 may depend on the size of the outer circumference of a given cable (typically dictated by the gauge of the cable). Similarly, the dimensions of a given cable retention channel opening 118a-b is such so as to receive the cable in a manner to adequately retain it, and yet allow its removal if needed. The retention ability may be enhanced depending on the material used for the cable retention clip 103. For example, The cable retention clip 103 may include a cable clip body 101 made of a resilient plastic material or the like that enables a "clip" effect, so as to allow some expansion of the cable retention channel opening (118a-b) to accommodate insertion of the cable by way of a pressing force on the cable into the cable retention channel opening 118. Once the cable is inserted, the cable retention channel 110 may slightly retract to its original shape, thereby retaining the cable within a given cable retention channel (110). In addition, the flexibility of the outer surface of a given cable may also be utilized to facilitate insertion and detachable retention within a given retention channel—e.g., the outer surface, such as deformable plastic, contracts slightly to allow insertion via a channel opening and, once inserted, slight expansion allows the cable to be resiliently and detachably retained within the channel. Disposed between each retention channel is a cable separator member 119 in the figures. This maintains adequate separation between adjacent cables, further ensuring against inadvertent shorts, for example.

As illustrated, the clip assembly 100 includes the component retention clip 148 that is removably couplable with the cable retention clip 103. The component retention clip 148 may be formed (for example, utilizing a suitable molding process if plastic) and separately the cable retention clip 103 may be formed. The component retention clip 148 may then be coupled with the cable retention clip 103. The coupling may be via the slide coupling of the protruding slide-coupling elements 160 into the slot slide-coupling elements 162.

As is shown, in one example the component retention clip 148 defines a component retention channel denoted at 150, which is in the clip body opening 144. The component retention channel 150 is sized and shaped so as to be capable of substantially conforming with at least a portion of a corresponding section of a planar support structure (e.g., bracket 102, H-pile 702, or other component) to attach thereto. Moreover, the component retention channel 150 includes a channel base surface 152, first channel side surface 154, and second channel side surface 156 that together resiliently engage the outer surface of the planar support structure. Alternatively, the side surfaces 154,156 may switch in orientation. In this way, the clip assembly 100 may be detachably fastened to the planar support structure, thereby maintaining the cables in a desired relative fashion to the solar installation component, yet allowing for removal and/or reattachment of the clip assembly 100.

The component retention clip 148 may include at least one grip element 170, which is exemplified as two grip elements 170; however, any number of grip elements 170 may be included. The grip element 170 is formed of a material that causes it to resist deformation and return to its original shape after deformation. In some embodiments, the grip element 170 is metal, resilient plastic, elastomer, or other deformable and shape memory material. The grip element 170 may provide increased grip strength to the component retention clip 148. The grip element 170 may bend as the component retention clip 148 is placed on the planar support structure, such that the grip element 170 is pushed to collapse to resiliently press against the planar support structure. In one example of an orientation, the grip element 170 is mounted to the first channel side surface 154 of the component retention channel 150, but it could be switched to the second channel side surface 156 with appropriate recesses to receive the fastening members. The grip element 170 may exert a force such that the planar support structure is pressed by both the grip element 170 and the second channel side surface 156 (or fist channel side surface 154 when switched). The component retention channel 150 may receive the planar support structure so that the pressing of the grip element 170 provides a grip normal to the plane of the planar support structure. The planar support structure may be pressed into the component retention channel 150 in a direction substantially towards the channel base surface 152 of the component retention channel 150, preventing the component retention clip 148 from becoming detached from the support structure (e.g., bracket 102, H-pile 702, etc.).

The interior shape and dimensions of the component retention channel 150 substantially correspond to that of a corresponding outer surface of a support structure. In one embodiment, the component retention channel 150 tapers towards the channel base surface 152 from the clip body opening 144, so as to provide "clamp" function to enhance the gripping force on the opposing surfaces of the planar support structure; however, the channel 150 may have parallel walls. Again, the material used for the component retention clip 148, such as a ceramic, composite, metal or plastic material, may provide additional resiliency so as to enhance the clamping force applied by the component retention clip 148, thereby securely retaining the clip assembly 100 with respect to the support structure.

The component retention clip body 146 may include a base wall 140, top wall 138, and bottom wall 136; however, the orientation may switch. The bottom wall 136 may include protruding slide-coupling elements 160, which include a center bi-directional protruding slide-coupling element 160a, and two side single-direction protruding slide-coupling elements 160b. The center bi-directional protruding slide-coupling element 160a is shown to have two sides that are each a trapezoidal shape that provides a direction of slidability to receive the slot slide-coupling elements 162. As such, each center bi-directional protruding slide-coupling element 160 may include two oppositely directed trapezoidal shapes for the slide-coupling function. Accordingly, the center bi-directional protruding slide-coupling element 160a may be two trapezoidal members that are integrated or separate. The trapezoidal members may be trapezoid in one or more planes, such as a bottom surface 164 that forms a plane and a side surface 166, which is also a cross-section that is orthogonal to the bottom surface 164. Accordingly, the side surface 166 provides the cross-sectional trapezoidal shape that forms the protruding slide-coupling element 160 shape that interlocks with the corresponding trapezoidal slot in the slot slide-coupling elements 162. The bottom surface 164 that has the trapezoidal shape provides for the friction fit coupling with the slot slide-coupling element 162 that also has a corresponding trapezoid in the slot shape. Therefore, the slot includes the same corresponding trapezoidal bottom surface and side surface profiles to form a tongue-in-groove slide coupling.

In example embodiments, the clip assembly 100 comprises a plastic material, and may exhibit resilient properties to enhance engagement with the cables and/or the bracket as discussed above. In some embodiments, some or all of the clip assembly 100 is non-conductive conductive, which may be advantageous in the event of an electrical short in a cable, for example. In embodiments, the material(s) used are also resilient to severe environmental conditions (cold, heat, humidity), so as to be able to withstand varying weather conditions present in a typical solar installation.

Figure 2A:
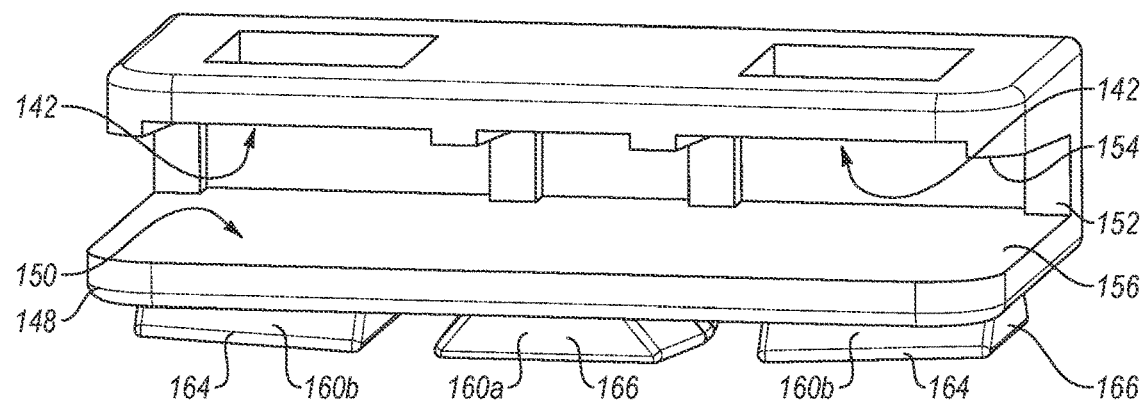
FIG. 2A shows a front perspective view of an embodiment of a component retention clip of a cable retention clip assembly.
Figure 2B:
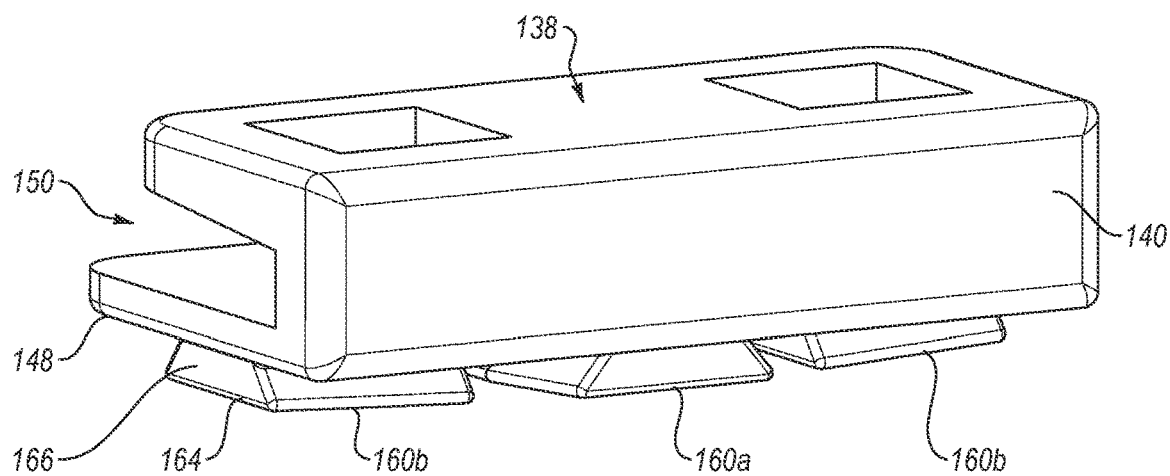
FIG. 2B shows a back perspective view of the component retention clip of FIG. 2A.
Figure 2C:
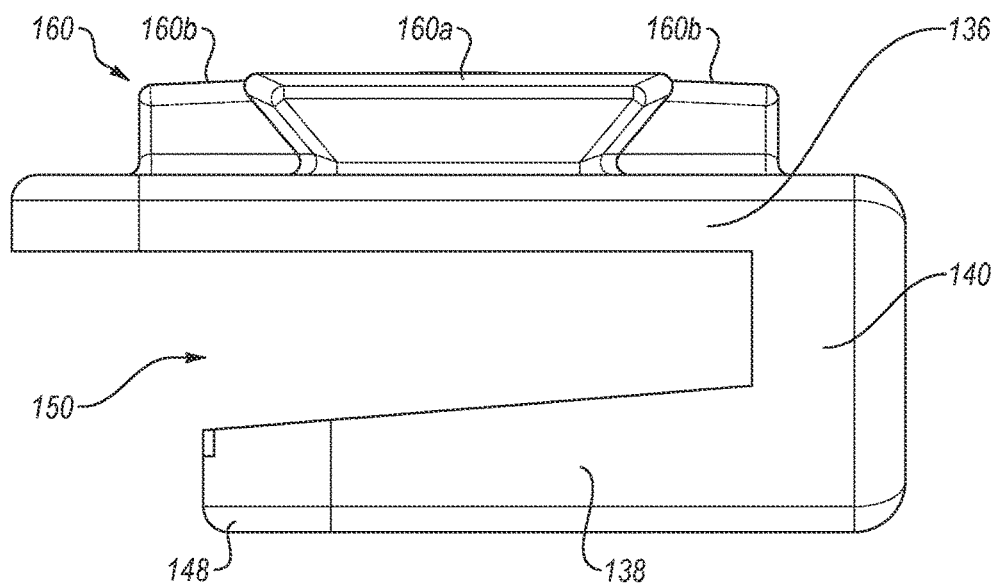
FIG. 2C shows a side view of the component retention clip of FIG. 2A.
Figure 2D:
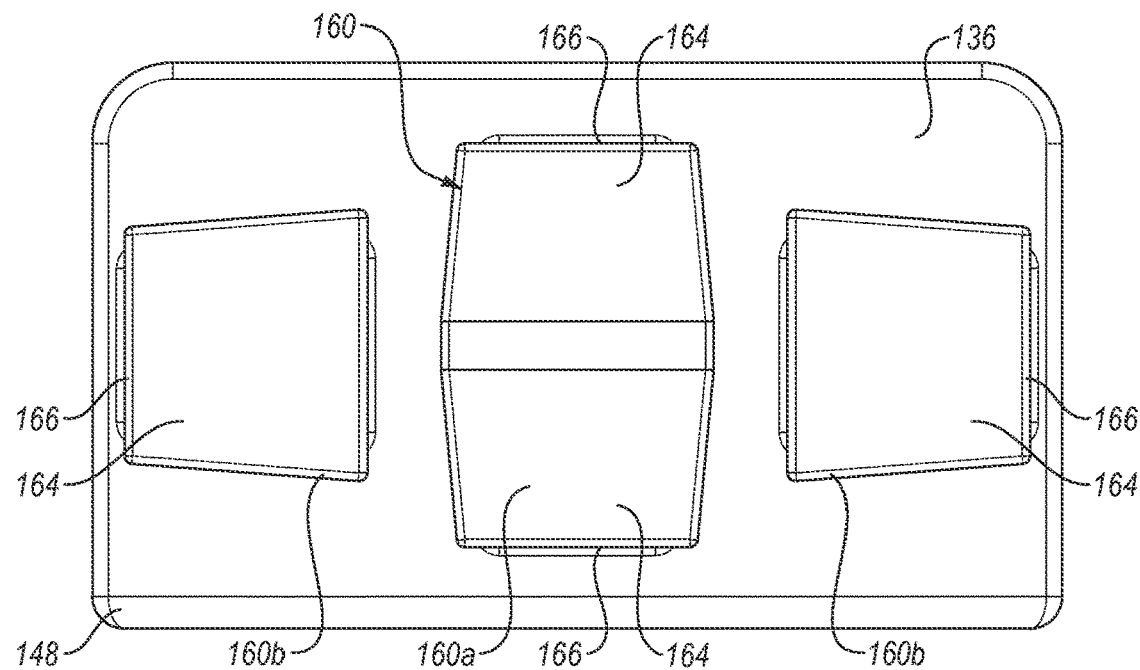
FIG. 2D shows a bottom view of the component retention clip of FIG. 2A.
Figure 2E:
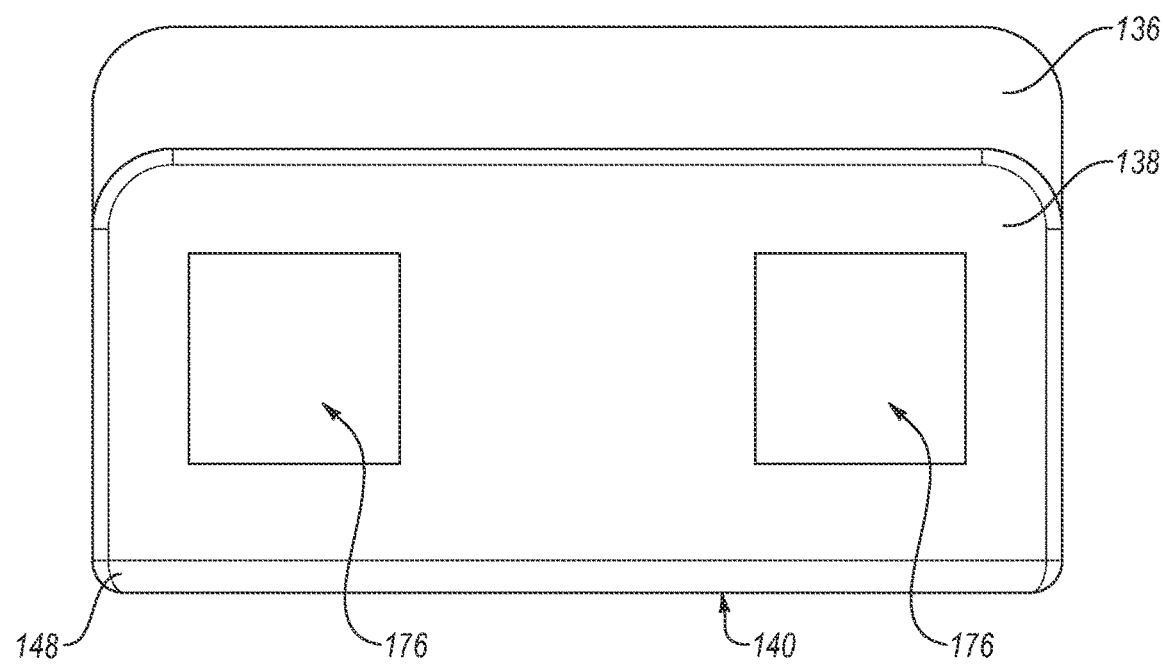
FIG. 2E shows a top view of the component retention clip of FIG. 2A.

FIGS. 2A-2F illustrate the component retention clip 148 having the features as described in connection with FIGS. 1A-1G; however, the cable retention clip 103 and grip elements 170 are omitted. FIG. 2A shows a front perspective view of the component retention clip 148. FIG. 2B shows a back perspective of the component retention clip 148. FIG. 2C shows a side view of the component retention clip 148. FIG. 2D shows a bottom view of the component retention clip 148. FIG. 2E shows a top view of the component retention clip 148.

In FIG. 2A, the component retention channel 150 is shown to include the clip receiver slots 142. In FIG. 2D, the center bi-directional protruding slide-coupling element 160a, and two side single-direction protruding slide-coupling elements 160b are shown without being coupled with a corresponding slot. As such, the bottom surface 164 is visible for each of the protruding slide-coupling elements 160 in FIG. 2D. Also, the side surface 166 is shown, which allows for the slide coupling. FIG. 2E shows the receptacles (e.g., apertures) 176, which may also be recessed in the channel surface (surface 154).

Figure 3A:
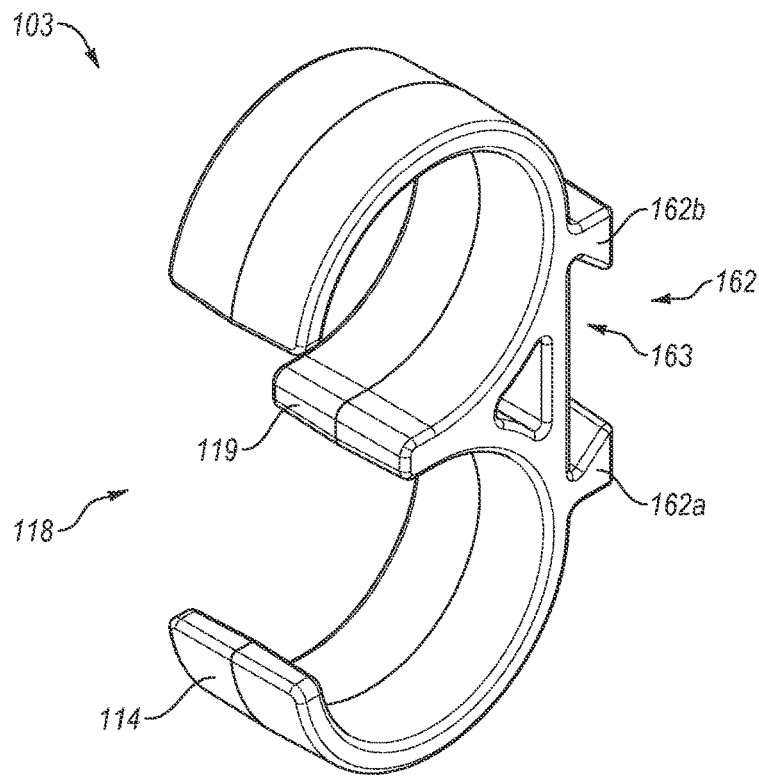
FIG. 3A shows a front perspective view of an embodiment of a cable retention clip of a cable retention clip assembly.
Figure 3B:
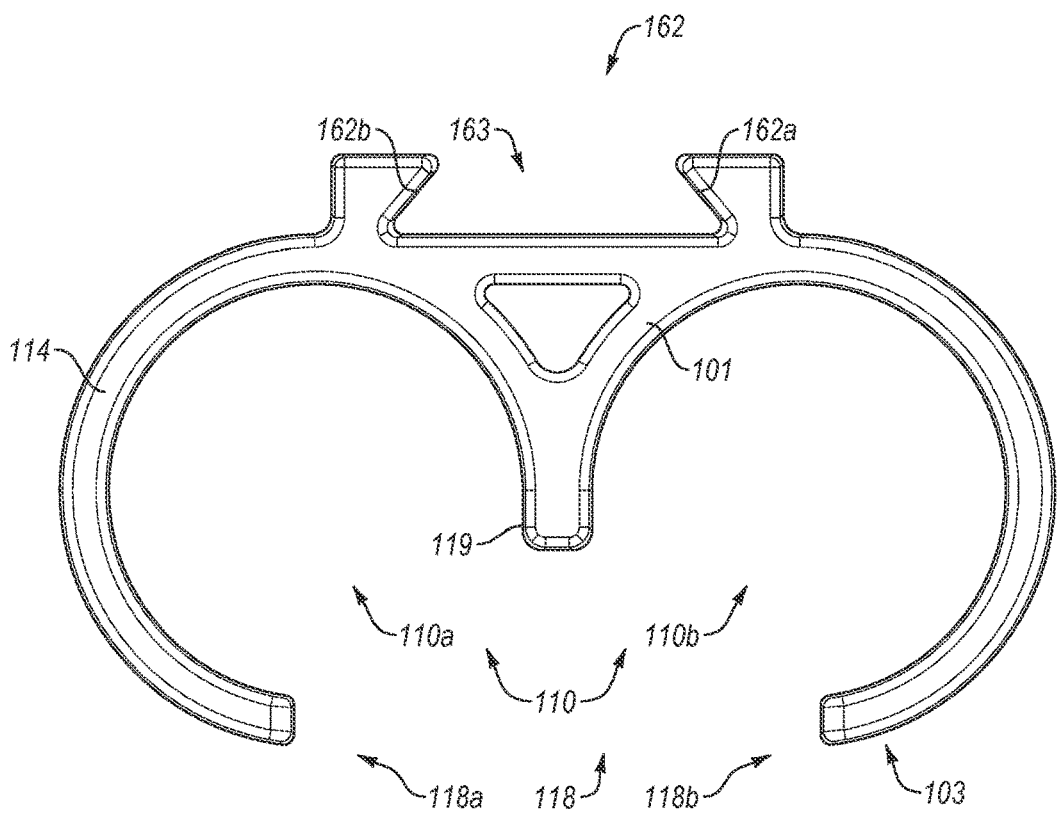
FIG. 3B shows a side view of the cable retention clip of FIG. 3A.

Reference is next made to FIGS. 3A-3B, which illustrate one example of the cable retention clip 103 of FIGS. 1A-1G. As noted, the cable retention clip 103 (one of which is shown in FIGS. 3A-3B) may be used in the cable management system so as to maintain connection and grouping between selected pairs (or more) of cables (such as is denoted at 106 and 108 in FIG. 8). The example cable retention clip 103 includes a cable clip body 101, defining one or more cable retention channels 110, two of which are shown in the example at 110a and 110b. The cable retention channels 110 are separated by a cable separator member 119.

The slot slide-coupling element 162 is shown to include two outer protrusions 162a, 162b that form the slot shape recess 163. The slot shape recess 163 is trapezoidal in cross-sectional profile and either square or trapezoidal longitudinal profile (slide direction is longitudinal). The cross-sectional profiles of the slot shape recess may have other shapes in other embodiments.

Figure 8:
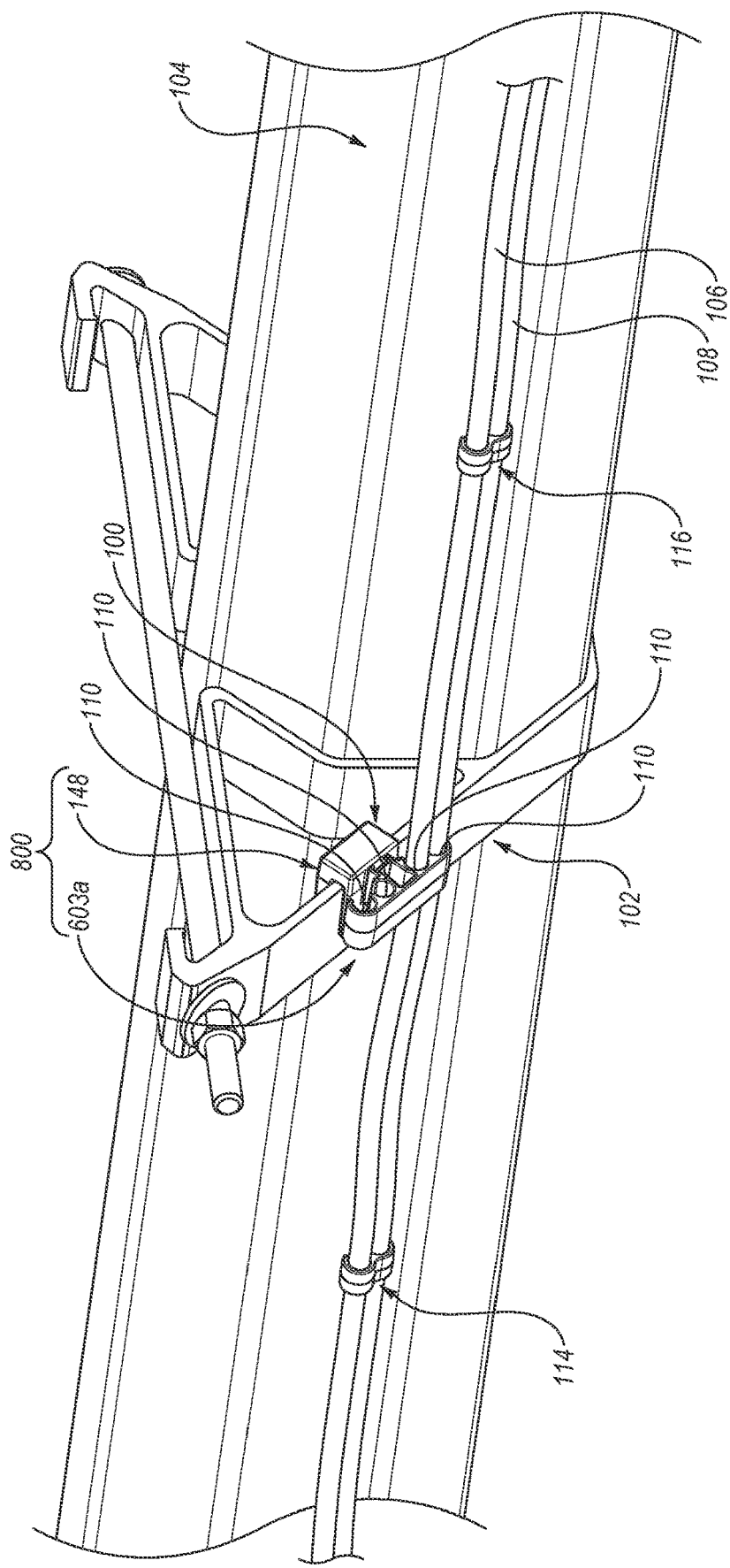
FIG. 8 illustrates a perspective view showing one example of a cable retention clip assembly being used in a typical solar installation by being coupled to a bracket.

Each cable retention channel 110 provides a clip cable receiving portion having a suitable shape—here a 'C' shape—so as to receive and retain in a detachable manner a corresponding cable 106, 108 (FIG. 8). Each cable retention channel 110 includes an adequate cable retention channel opening, denoted here at 118a and 118b to detachably receive and "clamp" a corresponding cable. The size (e.g., the diameter) of a given cable retention channel 110a,110b may depend on the size of the outer circumference of a given cable (or gauge of the cable) Similarly, the dimensions of a given cable retention channel opening 118a and 118b may be configured to receive the cable in a manner to adequately retain it, and yet allow its removal if needed. The retention ability may be enhanced depending on the material used for the cable clip body 101. For example, a resilient plastic material or the like enables a "clip' effect, so as to allow some expansion of the cable retention channel opening (118) to accommodate insertion of the cable by way of a pressing force on the cable into the cable retention channel opening 118. Once the cable is inserted, the retention channel may slightly retract to its original shape, thereby retaining the cable within a given cable retention channel (110). In addition, the flexibility of the outer surface of a given cable may also be utilized to facilitate insertion and detachable retention within a given retention channel—e.g., the outer surface, such as deformable plastic, contracts slightly to allow insertion via a caple retention channel opening (118) and, once inserted, slight expansion allows the cable to be resiliently and detachably retained within the channel. The cable retention clip (103) may utilize rounded surfaces in areas that may come into contact with a cable, so as to avoid any damage to the cable during insertion or retraction.

The cable clip body 101 may be a plastic material, and may exhibit resilient properties to enhance engagement with the cables as discussed above. In some embodiments, some or all of the cable retention clip 103 is non-conductive, which may be advantageous in the event of an electrical short in a cable, for example. In some embodiments, the material(s) used are also resistant to severe environmental conditions (cold, heat, humidity), so as to be able to withstand varying weather conditions present in a typical solar installation.

While the embodiment of the cable retention clip 103 described above illustrate an implementation that provides support and alignment of two equally sized (gauges) of cable, it will be appreciated that embodiments could be provided that support more than two cables, and/or that provide support for cables of different sizes (gauges). For example, FIGS. 6A-6D illustrate additional examples of a cable retention clip 603a, 603b, 603c, 603d, generically cable retention clips 603, that may couple with a component retention clip 148 for forming a clip assembly 100 as described herein.

Figure 4A:
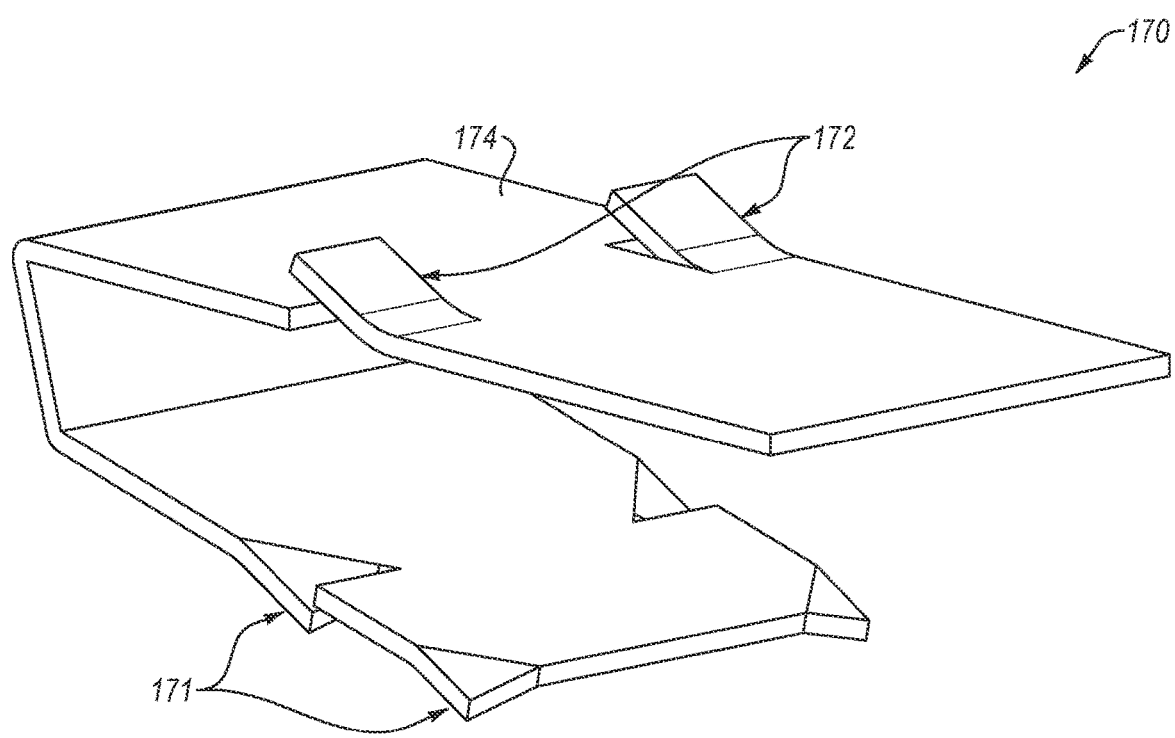
FIG. 4A shows a perspective view of a grip element of a cable retention clip assembly.
Figure 4B:
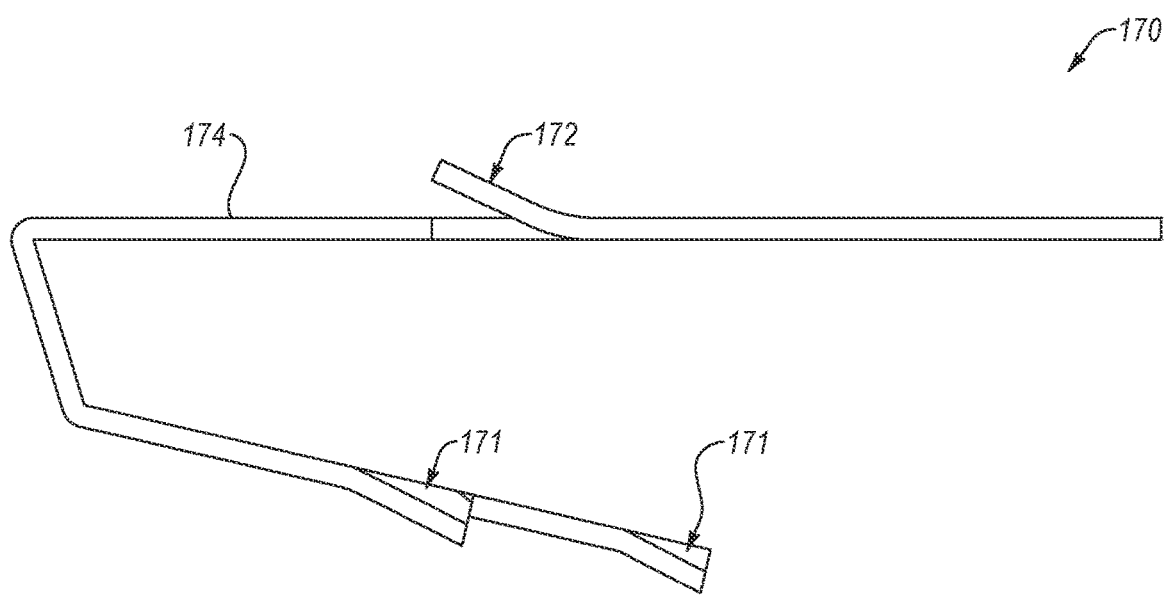
FIG. 4B shows a side view of the grip element of FIG. 4A.

FIGS. 4A-4B illustrate a perspective view and side view of an example of the grip element 170 of FIGS. 1A-1G. In these views, additional details of the grip element 170 are visible. The grip element 170 may include teeth 171 and retention spurs 172. The teeth 171 may be in contact with the planar substrate of the component received in the component retention channel 150 of the component retention clip 148 when the clip assembly 100 is attached to the planar substrate of the component. The teeth 171 may serve to prevent the planar substrate from slipping out of the component retention channel 150. The retention spurs 172 may serve to hold the grip element 170 firmly in the component retention clip 148 by protruding into the aperture 176. The retention spurs 172 may serve to brace the grip element 170 so as to prevent the grip element 170 from moving relative to the component retention clip 148. The two retention spurs 172 protrude into the aperture 176, and thereby have a resistance force against the walls of the apertures 176.

The retention spurs 172 may be formed in such a way so as to allow for removal of the grip element 170 from the component retention clip 148. For example, the retention spurs 172 may be formed so as to allow movement of the grip element 170 towards the bottom surface 156 of the component retention channel 150 to allow for removal of the grip element 170. In some embodiments, the grip element 170 may be formed in such a way so as to apply force to the bottom surface 152 and/or the side surfaces 154,156 of the component retention channel 150 when the component retention clip 148 is not attached to the planar substrate of the component to retain the grip element 170 in place.

Figure 5A:
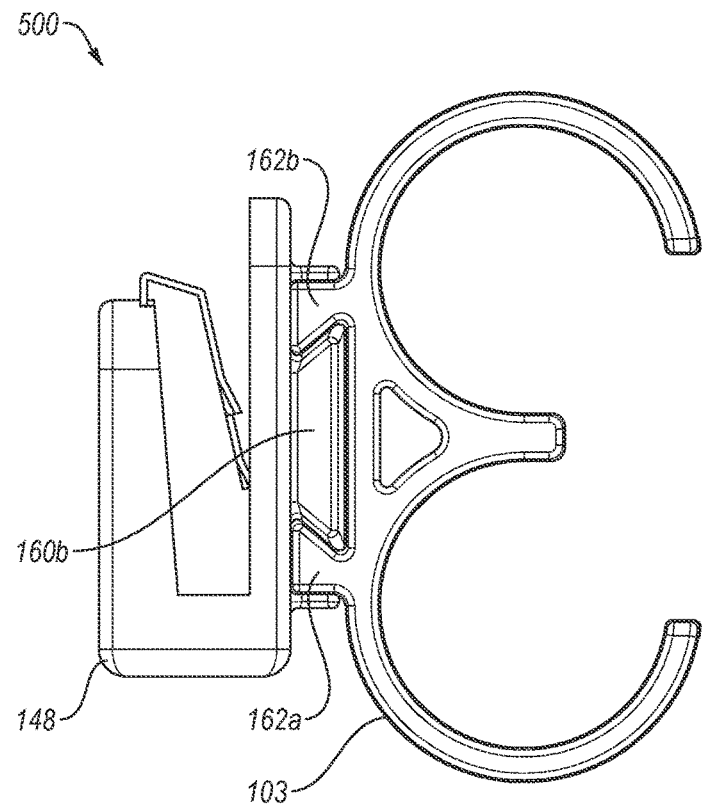
FIG. 5A shows another embodiment of a cable retention clip.

FIG. 5A shows a cable retention clip assembly (hereinafter "clip assembly") 500 that includes both the cable retention clip 103 and the component retention clip 148. In FIG. 5A, the cable retention clip 103 is mounted to the component retention clip 148 so that the cable retention channels 110 are directed in the orthogonal direction compared to FIGS. 1A-1G. As such, one of the single-direction protruding slide-coupling elements 160b of the component retention clip 148 slidably couples to the slot slide-coupling element 162 of the cable retention clip 103. The two outer protrusions 162a,162b are shown to contain therebetween the protruding slide-coupling element 160b.

Figure 5B:
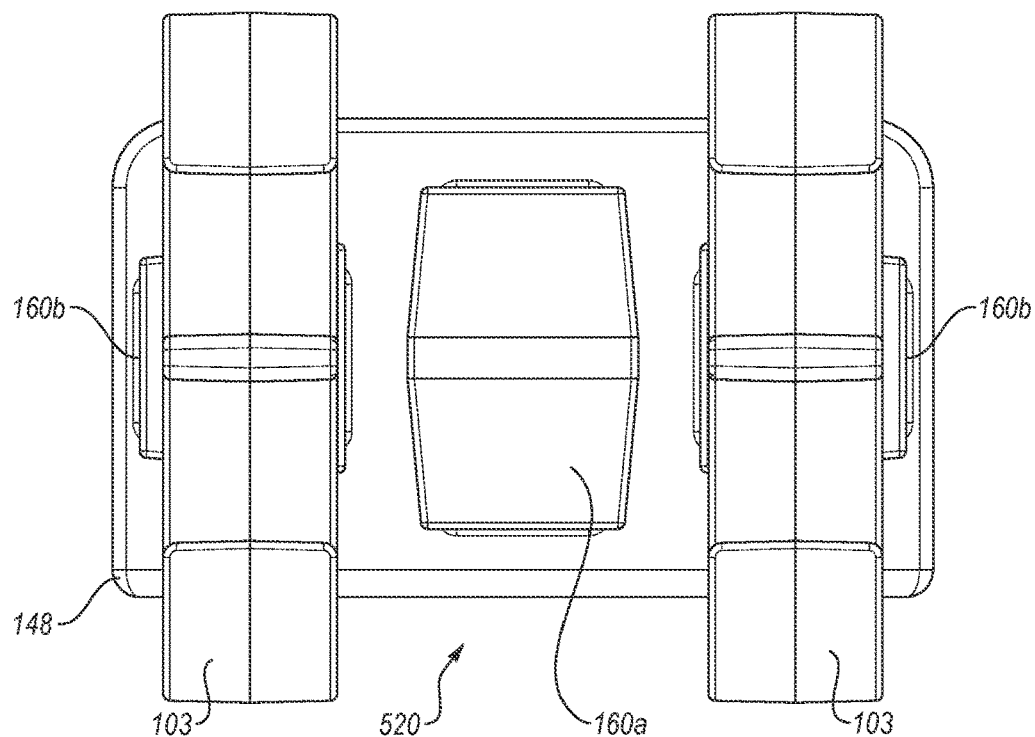
FIG. 5B shows another embodiment of a cable retention clip.

FIG. 5B shows a cable retention clip assembly (hereinafter "clip assembly") 520 having two cable retention clips 103 mounted one each on the two single-direction protruding slide-coupling elements 160b of the component retention clip 148.

Figure 6A:
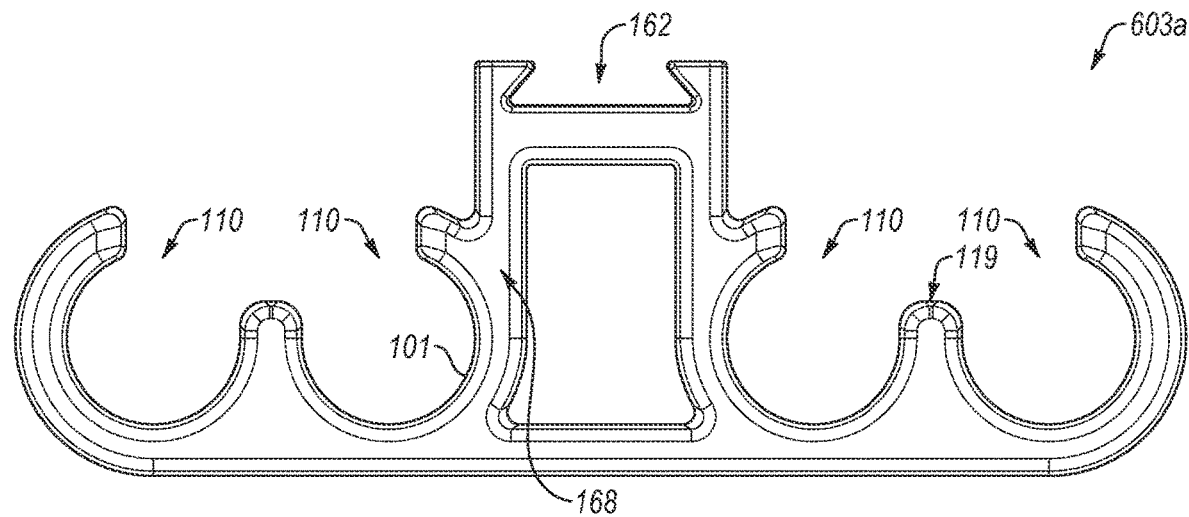
FIG. 6A shows another embodiment of a cable retention clip.

FIG. 6A shows another embodiment of a cable retention clip 603a having four cable retention channels 110 oriented toward the component retention clip 148 when mounted thereto. The cable retention clip 603a includes cable clip body 101 that defines the cable retention channels 110. The slot slide-coupling element 162 extends away from the clip body 101 via stem 168 formed in the clip body 101. The cable retention channels 110 are oriented toward the slot slide-coupling element 162.

Figure 6B:
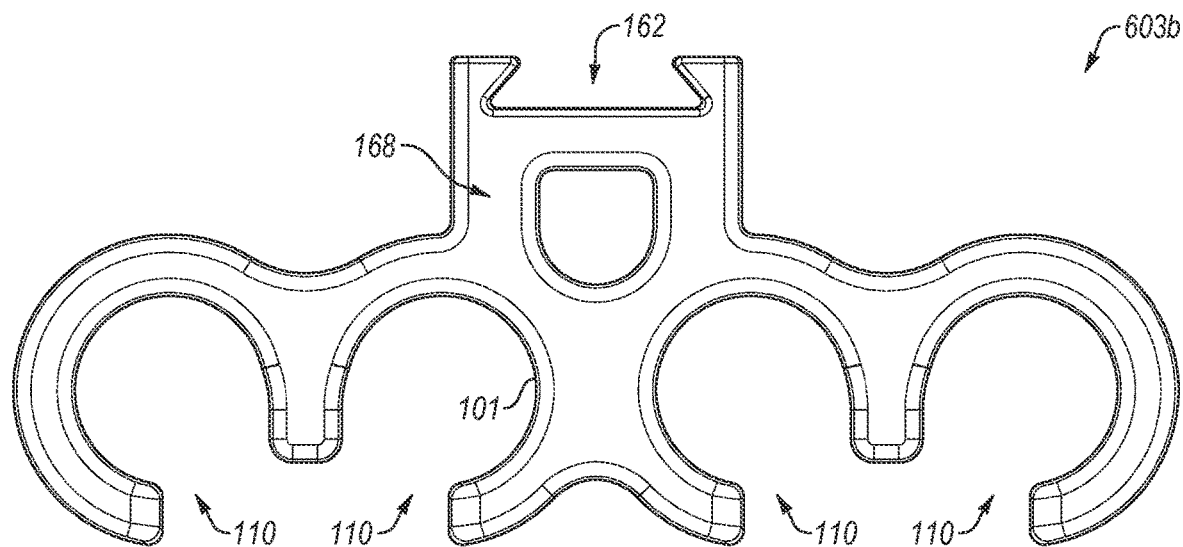
FIG. 6B shows another embodiment of a cable retention clip.

FIG. 6B shows another embodiment of a cable retention clip 603b having four cable retention channels 110 oriented away from the component retention clip 148 when mounted thereto. The cable retention clip 603b includes cable clip body 101 that defines the cable retention channels 110. The slot slide-coupling element 162 extends away from the clip body 101 via stem 168 formed in the clip body 101. The cable retention channels 110 are oriented away from the slot slide-coupling element 162.

Figure 6C:
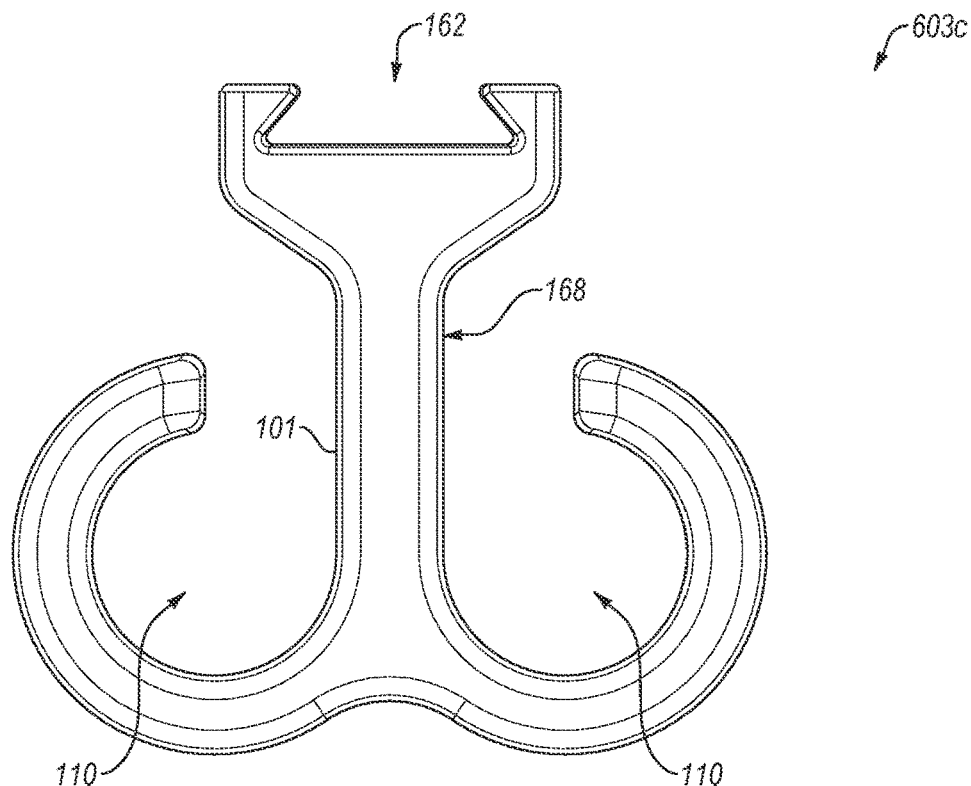
FIG. 6C shows another embodiment of a cable retention clip.

FIG. 6C shows another embodiment of a cable retention clip 603c having two cable retention channels 110 oriented toward the component retention clip 148 when mounted thereto. The cable retention clip 603c includes cable clip body 101 that defines the cable retention channels 110. The slot slide-coupling element 162 extends away from the clip body 101 via stem 168 formed in the clip body 101. The cable retention channels 110 are oriented toward the slot slide-coupling element 162.

Figure 6D:
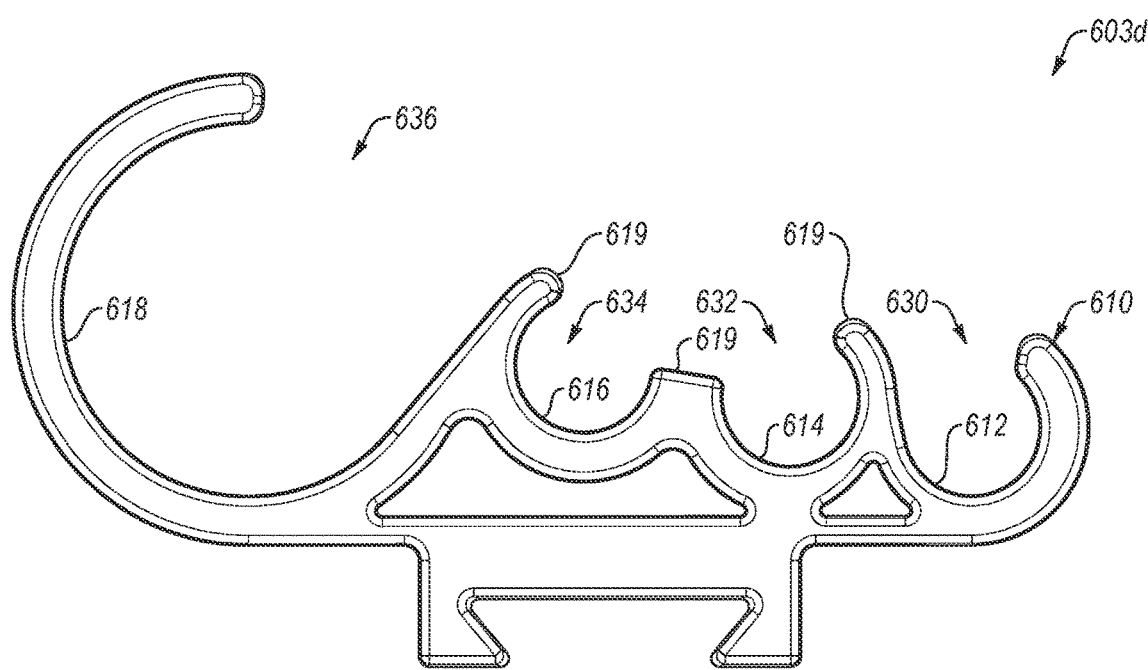
FIG. 6D shows another embodiment of a cable retention clip.

FIG. 6D shows an additional embodiment of a cable retention clip 603d. The cable retention clip 603d includes a clip body 610 that defines one or more cable retention channels, four of which are shown in the example at 612, 614, 616 and 618. Each cable retention channel 612, 614, 616 and 618 is separated from a corresponding adjacent cable retention channel by a corresponding cable separator member, three of which are denoted in FIG. 6D at 619. Each cable retention channel 612, 614, 616, 618 provides a clip cable receiving portion having a suitable shape—here a 'C' shape—so as to receive and retain in a removable manner a corresponding cable. Each cable retention channel 612, 614, 616, 618 includes an adequate cable retention channel opening, denoted here at 630, 632, 634, 636 to detachably receive and "clamp" a corresponding cable. The size (e.g., the diameter) of a given cable retention channel opening 630, 632, 634, 636 will depend on the size of the outer circumference of a given cable (or gauge of the cable). Similarly, the dimensions of a given cable retention channel opening 630, 632, 634, 636 is such so as to receive the corresponding cable in a manner to adequately retain it, and yet allow its removal if needed. The retention ability may be enhanced depending on the material used for the cable retention clip 603d. For example, a resilient plastic material or the like enables a "clip' effect, so as to allow some expansion of the cable retention channel opening (630, 632, 634 and 636) to accommodate insertion of the corresponding cable by way of a pressing force on the corresponding cable into the corresponding cable retention channel opening. Once the corresponding cable is inserted, the corresponding cable retention channel opening may slightly retract to its original shape, thereby retaining the cable within a given cable retention channel (612, 614, 616, 618). In addition, the flexibility of the outer surface of a given cable may also be utilized to facilitate insertion and detachable retention within a given cable retention channel—e.g., the outer surface, such as deformable plastic, contracts slightly to allow insertion via a corresponding cable retention channel opening and, once inserted, slight expansion allows the corresponding cable to be resiliently and detachably retained within the corresponding cable retention channel. The cable retention clip may utilize rounded surfaces in areas that may come into contact with a cable, so as to avoid any damage to the cable during insertion or retraction, as is shown. Additionally, it should be recognized that any number and combination of sizes of cable retention channels may be included in each cable retention clip.

In some embodiments, the cable retention clip includes a protruding slide-coupling element 160 and the component retention clip includes the slot slide-coupling element 162. This configuration is the opposite coupling as shown herein. However, it is well within the skill to switch which component has the protrusion and which has the recess of the slide-coupling elements 160, 162.

Figure 7:
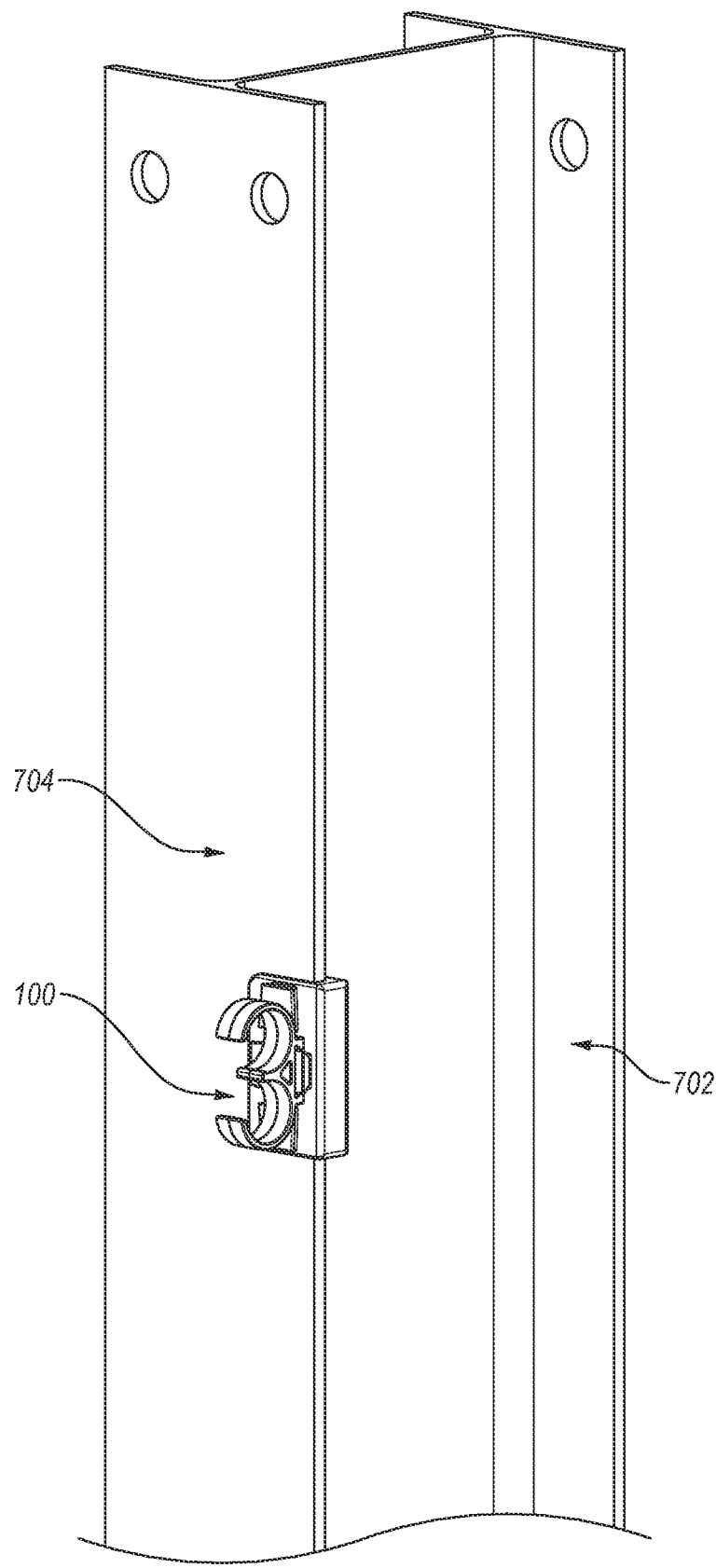
FIG. 7 illustrates a perspective view showing one example of a cable retention clip assembly being used in a typical solar installation by being coupled to an H-pile.

FIG. 7 shows an example use of the clip assembly 100 mounted to an H-pile 702. As shown, the H-pile 702 includes a planar substrate 704 (e.g., parallel flanges coupled via a web), a portion of which is received into the component retention channel 150.

FIG. 8 shows a clip assembly 800 mounted to a planar substrate of a component of a solar installation. The clip assembly 800 includes the component retention clip 148 and the cable retention clip 603a but may alternatively include any of the other component retention clips and/or cable retention clips described herein. A mounting bracket 102 may be used to support a PV solar panel (not shown) via a clamp, rail, H-pile, I-beam, cross-beam, and/or other combinations of structural components as well as PV components. As is known, electrical power generated by a PV solar panel in the form of direct current (DC) generated by a solar panel is conducted to combiner boxes, inverters and the like (not shown) by way of one or more cables, examples of which are denoted at 106, 108. Depending on the nature of the solar installation, there may be a large number of PV solar panels, resulting in a large number of cables. Thus, in a typical installation, many cables need to be oriented, routed and managed.

Further management of the cables may be provided by way of one or more cable clips, such as is denoted at 114 and 116. In the example shown, the cable clips 114, 116 retain cables 106 and 108 in a substantially parallel and detachable manner, further ensuring organization of the cables relative to the bracket and the support configuration. This maintains cable management and organization by reducing the opportunity for entanglement. Cable clips 114,116 may be the cable retention clip 103 with or without the coupling element, e.g., with or without slot slide-coupling elements 162.

The component retention clip 148 in FIG. 8 may include the grip element 170 (not shown in FIG. 8). The grip element 170 may be attached to the component retention clip 148 and in contact with the bracket 102 when the clip assembly 100 is detachably attached to the bracket 102.

In some embodiments, a cable retention clip assembly may be configured to detachably connect to a support structure associated with a PV solar panel. The cable retention clip assembly may include a cable retention clip. The cable retention clip may include two or more cable retention channels that are each configured to detachably receive a section of a corresponding cable associated with the PV solar panel. The cable retention clip assembly may include a component retention clip that is configured to be slidable attached to the cable retention clip. The component retention clip may be configured to detachably connect to a support section associated with the PV solar panel or PV solar panel system or PV solar panel array or PV solar panel installation. In some aspects, the component retention clip includes a retention cavity in the form of a slot that is sized and shaped so as to engage a corresponding surface of a PV solar panel support component in a detachable manner. The component retention clip may include a grip element which resiliently deforms as the retention clip is placed on a planar substrate of a PV solar component (e.g., PV solar panel support bracket or H-pile) so as to exert a force preventing the retention clip from becoming detached from the support component. Also, the component retention clip may have the grip element with one or more hook/protrusion portions that are configured to engage an aperture formed by a railing associated with a PV solar panel in a detachable manner. The cable retention clip also includes a cable retention clip body that defines at least one cable retention channel. There may be one or more cable retention channels configured to be detachably affixed to one or more cables.

The terms and words used in this description and claims are not limited to the bibliographical meanings, but, are merely used to enable a clear and consistent understanding of the disclosure. It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors are known to those skilled in the art, may occur in amounts that do not preclude the effect the characteristic was intended to provide.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, compounds, or materials, which can, of course, vary. It is also to be understood that the terminology used herein is for the purpose of describing particular embodiments only and is not intended to be limiting.

Aspects of the present disclosure may be embodied in other forms without departing from its spirit or essential characteristics. The described aspects are to be considered in all respects illustrative and not restrictive. The claimed subject matter is indicated by the appended claims rather than by the foregoing description. All changes which come within the meaning and range of equivalency of the claims are to be embraced within their scope.

What is claimed is:

1. A cable retention clip assembly comprising:
    a component retention clip comprising:
        a component retention clip body having a base wall and two side walls forming a planar slot therebetween;
        at least one grip element in the slot and coupled with at least one of the two side walls; and
        at least two bottom slide-coupling elements on an outer surface of at least one of the two side walls, each bottom slide-coupling element having a tapered cross-sectional profile in a longitudinal plane that narrows in a sliding axis towards an edge of the at least one of the two side walls, the at least two bottom slide-coupling elements including:
            a first bottom slide-coupling element having a first longitudinal plane in a first sliding axis; and
            a second bottom slide-coupling element having a second longitudinal plane in a second sliding axis that is at an angle with the first sliding axis; and
    a cable retention clip comprising:
        a cable retention clip body defining at least two cable retention channels each having a cable retention channel opening, each cable retention channel being parallel with each other cable retention channel; and
        a cable clip slide-coupling element having a slide direction parallel with each cable retention channel.

2. The cable retention clip assembly of claim 1, wherein one bottom slide-coupling element of the component retention clip couples to the cable clip slide-coupling element to couple the component retention clip to the cable retention clip.

3. The cable retention clip assembly of claim 1, wherein each bottom slide-coupling element is configured to slidably couple and friction-fit retain the cable clip slide-coupling element.

4. The cable retention clip assembly of claim 1, wherein:
    each bottom slide-coupling element is a protruding slide-coupling element that has a trapezoidal cross-sectional profile, and the cable clip slide-coupling element is a recess slide-coupling element that has a complementary trapezoidal cross-sectional profile; or
    each bottom slide-coupling element is a recess slide-coupling element that has a trapezoidal cross-sectional profile, and the cable clip slide-coupling element is a protruding slide-coupling element that has a complementary trapezoidal cross-sectional profile.

5. The cable retention clip assembly of claim 1, wherein the at least two bottom slide-coupling elements include three bottom slide-coupling elements and wherein at least two of the bottom slide-coupling elements have a trapezoidal cross-sectional profile in the longitudinal plane.

6. The cable retention clip assembly of claim 1, wherein the at least two bottom slide-coupling elements comprise a bi-directional slide-coupling element on the outer surface of the respective wall, the bi-directional slide-coupling element having at least two trapezoidal cross-sectional profiles that each taper towards opposite edges of the respective wall.

7. The cable retention clip assembly of claim 1, wherein at least one of:
    each grip element includes one or more retention spurs that protrude into an aperture formed in the component retention clip body to hold the grip element in the planar slot; or
    each grip element includes one or more teeth to engage a planar substrate of a component when the planar substrate is slidably received in the planar slot.

8. A method of manufacturing a cable retention clip assembly, comprising:
    fabricating a component retention clip body of a component retention clip to have a base wall and two side walls that form a planar slot therebetween, and to have at least two bottom slide-coupling elements on an outer surface of at least one of the two side walls;

coupling at least one grip element with at least one side wall in the slot;

fabricating a cable retention clip body of a cable retention clip to define at least two cable retention channels each having a cable retention channel opening, each cable retention channel being parallel with each other cable retention channel, and to have a cable clip slide-coupling element having a slide direction parallel with each cable retention channel; and slidably engaging the cable retention clip onto the component retention clip so that the cable clip slide-coupling element of the cable retention clip slidably couples with at least one of the bottom slide-coupling elements of the component retention clip.

9. A cable retention clip assembly, comprising:
a cable retention clip defining a cable retention channel; and
a component retention clip couplable to the cable retention clip, the component retention clip comprising:
  a body having a base wall and two side walls forming a planar slot therebetween;
  at least one grip element in the slot and coupled with at least one of the two side walls; and
  at least two bottom slide-coupling elements on an outer surface of at least one of the two side walls and each configured to independently couple with the cable retention clip, each bottom slide-coupling element having a tapered cross-sectional profile in a longitudinal plane that narrows in a sliding axis towards an edge of the at least one of the two side walls and having a trapezoidal cross-sectional profile in a lateral plane that is orthogonal with the longitudinal plane, the at least two bottom slide-coupling elements including:
    a first bottom slide-coupling element having a first longitudinal plane in a first sliding axis; and
    a second bottom slide-coupling element having a second longitudinal plane in a second sliding axis that is at an angle with the first sliding axis.

10. The cable retention clip assembly of claim 9, the component retention clip comprising at least two grip elements, wherein each grip element is in a grip element slot in the planar slot.

11. The cable retention clip assembly of claim 10, the component retention clip further comprising at least two grip receptacles in the respective side wall coupled with the at least two grip elements, each grip receptacle receiving a retention spur of the respective grip element.

12. The cable retention clip assembly of claim 9, wherein the at least two bottom slide-coupling elements include three bottom slide-coupling elements and wherein at least two of the bottom slide coupling elements have a trapezoidal cross-sectional profile in the longitudinal plane.

13. The cable retention clip assembly of claim 9, wherein the at least two bottom slide-coupling elements comprise a bi-directional slide-coupling element on the outer surface of the respective wall, the bi-directional slide-coupling element having at least two trapezoidal cross-sectional profiles that each taper towards opposite edges of the respective wall.

14. The cable retention clip assembly of claim 9, wherein:
each bottom slide-coupling element is a protruding slide-coupling element that has the trapezoidal cross-sectional profile; or
each bottom slide-coupling element is a recess slide-coupling element that has the trapezoidal cross-sectional profile.

15. A cable retention clip assembly comprising:
a component retention clip; and
a cable retention clip couplable to the component retention clip, the cable retention clip comprising:
  a body defining at least two cable retention channels each having a cable retention channel opening, each cable retention channel being parallel with each other cable retention channel; and
  a cable clip slide-coupling element formed by the body and having a slide direction parallel with each cable retention channel, the cable clip slide-coupling element configured to couple with the component retention clip,
wherein:
  the cable clip slide-coupling element is a protruding slide-coupling element that has both a trapezoidal cross-sectional profile in a plane perpendicular to the slide direction and a trapezoidal longitudinal profile in a plane parallel to the slide direction; or
  the cable clip slide-coupling element is a recess slide-coupling element that has both a trapezoidal cross-sectional profile in a plane perpendicular to the slide direction and a trapezoidal longitudinal profile in a plane parallel to the slide direction.

16. The cable retention clip assembly of claim 15, wherein each cable retention channel has a "C"-shape and is separated from each other cable retention channel by a corresponding cable separator member.

17. The cable retention clip assembly of claim 15, wherein:
the cable retention channels are oriented toward the cable clip slide-coupling element; or
the cable retention channels are oriented away from the cable clip slide-coupling element.

18. The cable retention clip assembly of claim 15, wherein:
the cable retention channels include a first cable retention channel having a first size and a second cable retention channel having a second size that is different than the first size; or
the cable retention channels include a first cable retention channel having a same size as a second cable retention channel.

* * * * *